US012785741B2

(12) United States Patent
Kim et al.

(10) Patent No.: US 12,785,741 B2
(45) Date of Patent: Nov. 3, 2026

(54) ELECTRONIC DEVICE AND METHOD FOR CONTROLLING GROUND CIRCUIT

(71) Applicant: Samsung Electronics Co., Ltd., Suwon-si (KR)

(72) Inventors: Gibae Kim, Suwon-si (KR); Kangho Ko, Suwon-si (KR); Kumjong Sun, Suwon-si (KR); Younggung Song, Suwon-si (KR); Gunhyuk Yoon, Suwon-si (KR); Sunggeun Lee, Suwon-si (KR); Yonggoo Lee, Suwon-si (KR); Donghyun Jo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 50 days.

(21) Appl. No.: 19/066,940

(22) Filed: Feb. 28, 2025

(65) Prior Publication Data

US 2025/0202514 A1 Jun. 19, 2025

Related U.S. Application Data

(63) Continuation of application No. PCT/KR2023/012738, filed on Aug. 28, 2023.

(30) Foreign Application Priority Data

Sep. 2, 2022 (KR) ........................ 10-2022-0111748
Sep. 29, 2022 (KR) ........................ 10-2022-0124733

(51) Int. Cl.
*H04B 1/10* (2006.01)

(52) U.S. Cl.
CPC .................................. *H04B 1/1027* (2013.01)

(58) Field of Classification Search
CPC . H04B 1/1027; H04B 1/401; H04B 2215/061
See application file for complete search history.

(56) References Cited

U.S. PATENT DOCUMENTS 8,218,397 B2 7/2012 Chan
8,917,873 B2 12/2014 Kim
(Continued)

FOREIGN PATENT DOCUMENTS

KR 10-0724404 B1 6/2007
KR 10-2009-0063354 A 6/2009
(Continued)

OTHER PUBLICATIONS

Extended European Search Report dated Nov. 10, 2025, issued in European Patent Application No. 23860821.0.
(Continued)

*Primary Examiner* — Jaison Joseph
(74) *Attorney, Agent, or Firm* — Jefferson IP Law, LLP

(57) ABSTRACT

An electronic device is provided. The electronic device includes an audio module, an audio module ground circuit for the audio module, at least one antenna, at least one antenna ground circuit for the at least one antenna memory storing one or more computer programs, and one or more processors communicatively coupled to the audio module, the audio module ground circuit, the least one antenna, the least one antenna ground circuit and the memory, and wherein the one or more computer programs include computer-executable instructions that, when executed by the at least one or more processors individually or collectively, cause the electronic device to identify that the electronic device is in time division multiple access (TDMA) communication or time division duplex (TDD) communication while the audio module operates, identify a transmission power in the communication based on identifying that the electronic device is in the TDMA communication or the
(Continued)

TDD communication while the audio module operates, and change a ground circuit of the audio module from the audio module ground circuit to one of the at least one antenna ground circuit in a case that the identified transmission power exceeds a threshold.

20 Claims, 12 Drawing Sheets

(56) References Cited

U.S. PATENT DOCUMENTS

| | | | | |
|---|---|---|---|---|
| 9,374,155 | B2 * | 6/2016 | Sagong | H04B 7/2643 |
| RE47,049 | E | 9/2018 | Zhu et al. | |
| 10,103,495 | B2 * | 10/2018 | Blin | H01P 1/00 |
| 10,698,050 | B2 | 6/2020 | Poole et al. | |
| 10,718,835 | B2 | 7/2020 | Poole et al. | |
| 12,652,556 | B2 * | 6/2026 | Buer | H04W 24/02 |
| 2012/0063445 | A1 | 3/2012 | Sim | |
| 2014/0082230 | A1 | 3/2014 | Ban et al. | |
| 2014/0241217 | A1 * | 8/2014 | Li | H04B 1/3805 370/278 |
| 2021/0329377 | A1 * | 10/2021 | Yu | H04R 5/04 |
| 2022/0247441 | A1 * | 8/2022 | Cho | H04B 1/1615 |
| 2024/0267444 | A1 | 8/2024 | Kim et al. | |
| 2025/0202514 | A1 * | 6/2025 | Kim | H04B 1/1027 |

FOREIGN PATENT DOCUMENTS

| | | | |
|---|---|---|---|
| KR | 10-2012-0099900 | A | 9/2012 |
| KR | 10-1820741 | B1 | 1/2018 |
| KR | 10-1881393 | B1 | 7/2018 |
| WO | 2019/168221 | A1 | 9/2019 |

OTHER PUBLICATIONS

3rd Generation Partnership Project; Technical Specification Group Radio Access Network; NR; Base Station (BS) radio transmission and reception (Release 17), 3GPP TS 38.104 V17.5.0 (Mar. 2022), Mar. 17, 2022.

International Search Report dated Dec. 8, 2023, issued in International Application No. PCT/KR2023/012738.

* cited by examiner

ELECTRONIC DEVICE AND METHOD FOR CONTROLLING GROUND CIRCUIT

CROSS-REFERENCE TO RELATED APPLICATION(S)

This application is a continuation application, claiming priority under 35 U.S.C. § 365(c), of an International application No. PCT/KR2023/012738, filed on Aug. 28, 2023, which is based on and claims the benefit of a Korean patent application number 10-2022-0111748, filed on Sep. 2, 2022, in the Korean Intellectual Property Office, and of a Korean patent application number 10-2022-0124733, filed on Sep. 29, 2022, in the Korean Intellectual Property Office, the disclosure of each of which is incorporated by reference herein in its entirety.

BACKGROUND

1. Field

The disclosure relates to an electronic device and a method for controlling a ground circuit.

2. Description Related Art

Noise may be generated in an audio signal of an electronic device including an audio module. The electronic device may reduce noise generation through a ground circuit.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device and a method for controlling a ground circuit.

Additional aspects will be set forth in part in the description which follows and, in part, will be apparent from the description, or may be learned by practice of the presented embodiments.

In accordance with an aspect of the disclosure, an electronic device is provided. The electronic device includes an audio module, an audio module ground circuit for the audio module, at least one antenna, at least one antenna ground circuit for the at least one antenna, memory storing one or more computer programs, and one or more processors communicatively coupled to the audio module, the audio module ground circuit, the at least one antenna, the at least one antenna ground circuit and the memory, wherein the one or more computer programs include computer-executable instructions that, when executed by the one or more processors individually or collectively, cause the electronic device to identify that the electronic device is in time division multiple access (TDMA) communication or time division duplex (TDD) communication while the audio module operates, identify a transmission power in the communication based on identifying that the electronic device is in the TDMA communication or the TDD communication while the audio module operates, and change a ground circuit of the audio module from the audio module ground circuit to one of the at least one antenna ground circuit in a case that the identified transmission power exceeds a threshold.

In accordance with another aspect of the disclosure, a method performed by an electronic device is provided. The method includes identifying, by the electronic device, that the electronic device is in time division multiple access (TDMA) communication or time division duplex (TDD) communication while an audio module operates, identifying, by the electronic device, a transmission power in the communication based on identifying that the electronic device is in the TDMA communication or the TDD communication while the audio module operates, and in a case that the identified transmission power exceeds a threshold, changing, by the electronic device, a ground circuit of the audio module from an audio module ground circuit to one of at least one antenna ground circuit.

In accordance with another aspect of the disclosure, one or more non-transitory computer-readable storage media storing one or more computer programs including computer-executable instructions that, when executed by one or more processors of an electronic device individually or collectively, cause the electronic device to perform operations are provided. The operations include identifying that the electronic device is in time division multiple access (TDMA) communication or time division duplex (TDD) communication while an audio module operates, identifying, by the electronic device, a transmission power in the communication based on identifying that the electronic device is in the TDMA communication or the TDD communication while the audio module operates, and in a case that the identified transmission power exceeds a threshold, changing, by the electronic device, a ground circuit of the audio module from an audio module ground circuit to one of at least one antenna ground circuit.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
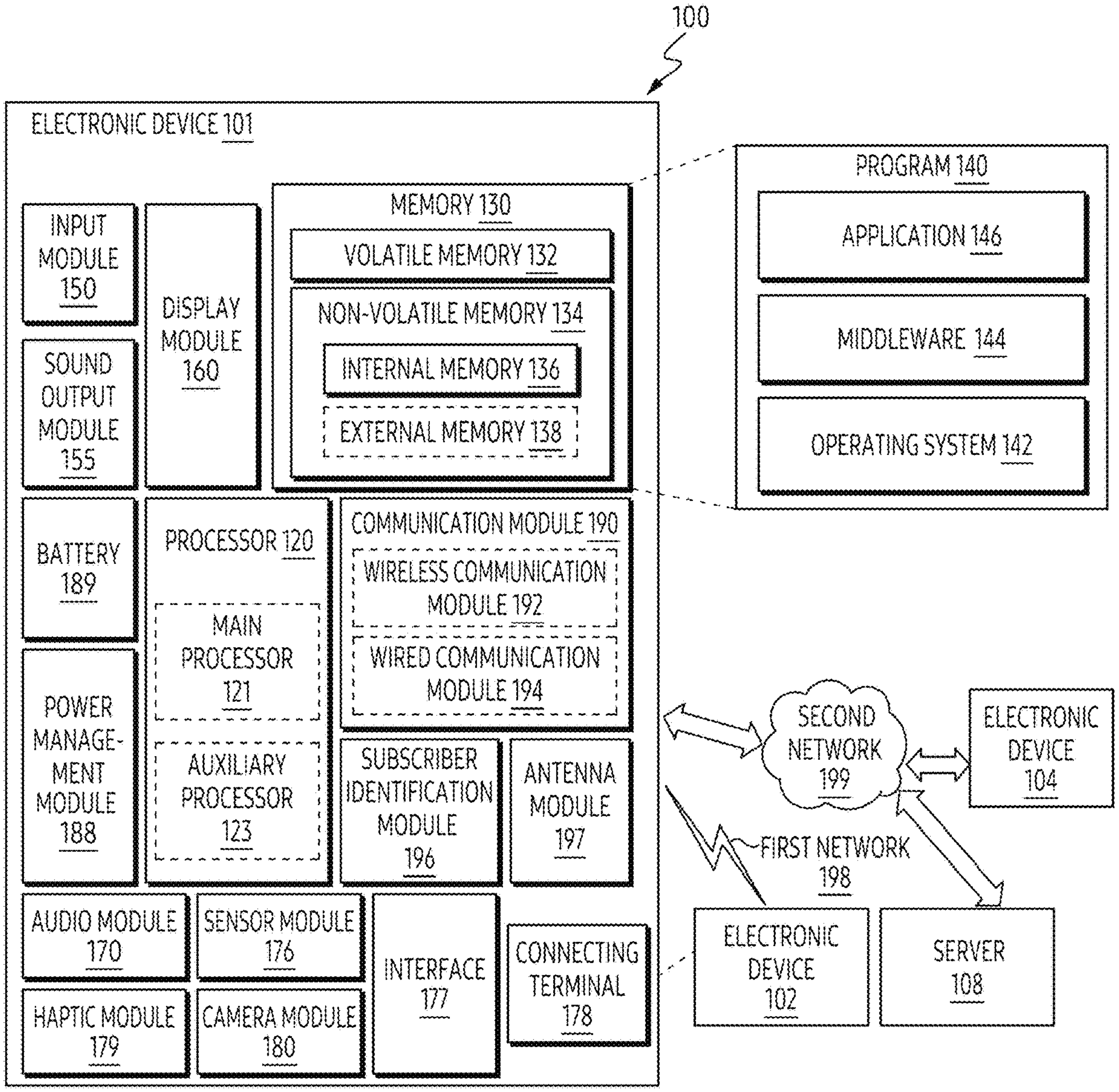
FIG. 1 is a block diagram of an electronic device in a network environment, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In various embodiments of the disclosure described below, a hardware approach will be described as an example. However, since the various embodiments of the disclosure include technology that uses both hardware and software, the various embodiments of the disclosure do not exclude a software-based approach.

Terms referring to a ground circuit (e.g., the ground circuit, a GND circuit, or a grounding circuit), terms referring to a level (e.g., a level, a step, or a section), or terms referring to a specified value (a designated value, a reference value, or a threshold value), used in the following description, are exemplified for convenience of explanation. Therefore, the disclosure is not limited to terms to be described below, and another term having an equivalent technical meaning may be used. In addition, a term such as '. . . unit, '. . . device, '. . . object, and '. . . structure', and the like used below, may mean at least one shape structure or may mean a unit processing a function.

In addition, in the disclosure, the term 'greater than' or 'less than' may be used to determine whether a particular condition is satisfied or fulfilled, but this is only a description to express an example and does not exclude description of 'greater than or equal to' or 'less than or equal to'. A condition described as 'greater than or equal to' may be replaced with 'greater than', a condition described as 'less than or equal to' may be replaced with 'less than', and a condition described as ' greater than or equal to and less than' may be replaced with 'greater than and less than or equal to'. In addition, hereinafter, 'A' to 'B' means at least one of elements from A (including A) to B (including B).

Before describing embodiments of the disclosure, terms necessary to describe operations of an electronic device according to various embodiments are defined.

Time division multiple access (TDMA) refers to a communication scheme transmitting and receiving a signal between the electronic device and a base station as a time section for transmitting the signal and a time section for receiving the signal are divided. A ground circuit is a circuit for setting a reference point of a voltage. As the reference point of the voltage is set, noise may be reduced. A filter refers to an element that passes only a signal of a specific frequency band. A switch refers to a device used to change a contact of an electrical circuit. Noise refers to an unintended signal component. Hereinafter, the noise refers to a signal component generated by wireless communication using a time division multiple access (TDMA) scheme (or a time division duplex (TDD) scheme).

A time division duplex (TDD) refers to a wireless communication scheme in which a resource assigned to a transmission signal and a resource assigned to a reception signal are distinguished in a time domain, in other words, a wireless communication scheme in which a transmission time resource and a reception time resource are distinguished.

Hereinafter, various embodiments disclosed in the document will be described with reference to the accompanying drawings. For convenience of explanation, a size of components illustrated in the drawings may be exaggerated or reduced, and the disclosure is not necessarily limited to those illustrated.

Various embodiments disclosed in the disclosure may improve call quality by reducing time division multiple access (TDMA) noise (or time division duplex (TDD) noise). The time division multiple access (TDMA) refers to the communication scheme transmitting and receiving the signal between the electronic device and the base station as the time section for transmitting the signal and the time section for receiving the signal are divided. In case that wireless communication using the TDMA scheme (or the TDD scheme) is performed, the TDMA noise (or the TDD noise) may occur in an audio signal of the electronic device performing the wireless communication. The TDMA noise (or the TDD noise) may be caused by a difference in power consumption between a section for transmitting the signal and a section for receiving the signal. In other words, the TDMA noise (or the TDD noise) may occur because more power is consumed in the time section for transmitting the signal than in the time section for receiving the signal. The electronic device may repeat transmission and reception during a predetermined time section. A frequency corresponding to a repetition period in which a transmission section and a reception section are changed may at least partially overlap a frequency band of the audio signal. The TDMA noise (or the TDD noise) may be a constant frequency corresponding to a transmission/reception period. The electronic device according to various embodiments may solve the above-described problem through a ground circuit. Various embodiments disclosed in the disclosure may improve the call quality by reducing the TDMA noise (or the TDD noise).

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a microprocessor unit (MPU), a system on chip (SoC), an IC, or the like.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and performs various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 is adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data includes, for example, software (e.g., the program 140) and input data or output data for a command related thereto. The memory 130 may include the volatile memory 132 or the non-volatile memory 134.

The program 140 may be stored in the memory 130 as software, and includes, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 includes, for example, a microphone, a mouse, a keyboard, a key (e.g., a button), or a digital pen (e.g., a stylus pen).

The sound output module 155 may output sound signals to the outside of the electronic device 101. The sound output module 155 includes, for example, a speaker or a receiver.

The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 includes, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 includes, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 includes, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 includes, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 includes, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 includes, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
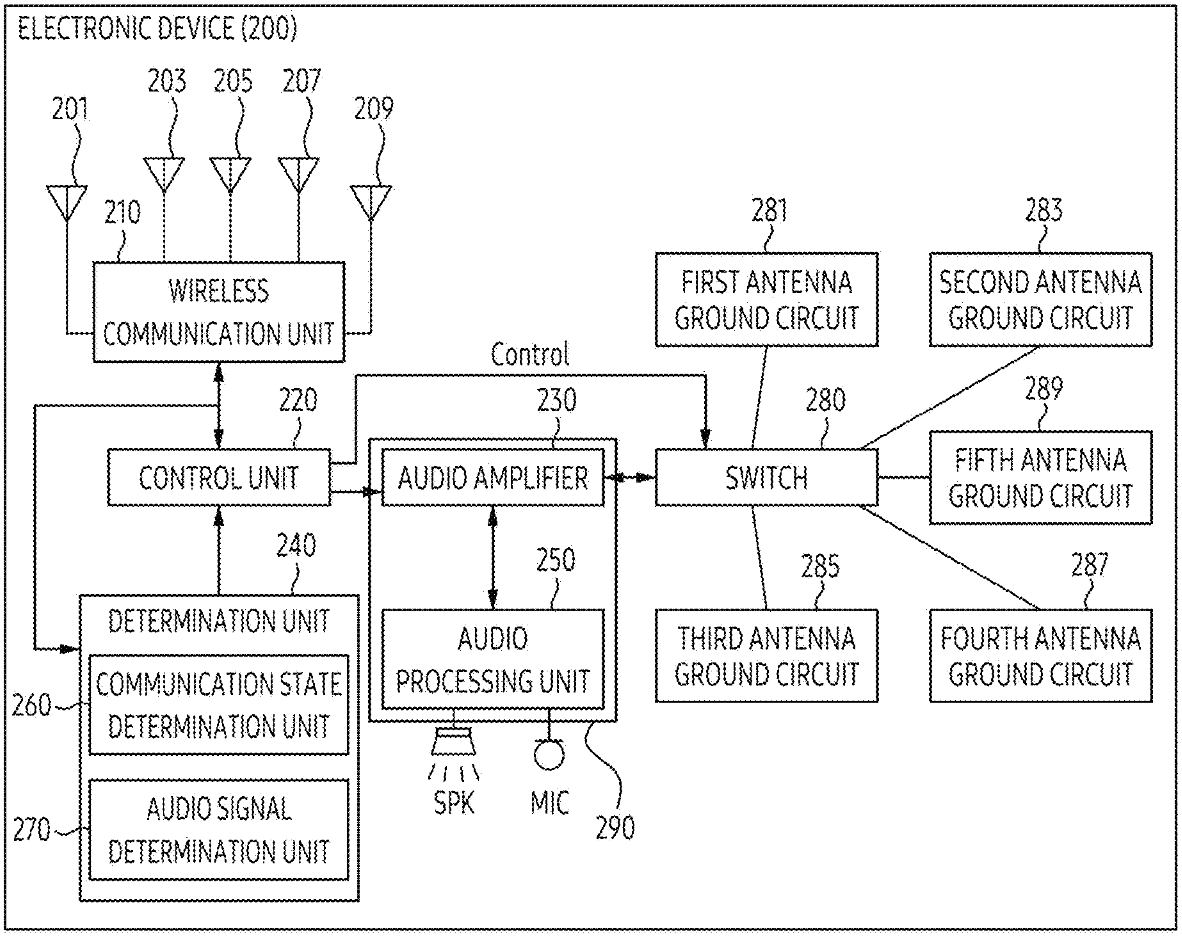
FIG. 2 illustrates an example of a functional configuration of an electronic device for noise reduction, according to an embodiment of the disclosure.

FIG. 2 illustrates an example of a functional configuration of an electronic device for noise reduction, according to an embodiment of the disclosure.

Referring to FIG. 2, an electronic device 200 (e.g., the electronic device 101 of FIG. 1) may include components for changing a ground circuit. The electronic device 200 may include a wireless communication unit 210 (e.g., the wireless communication module 192 of FIG. 1). The wireless communication unit 210 may perform wireless communication and identify a communication state. The electronic device 200 may include a plurality of antennas (a first antenna 201, a second antenna 203, a third antenna 205, a fourth antenna 207, and a fifth antenna 209). The electronic device 101 may receive a wireless communication signal through the plurality of antennas (e.g., the first antenna 201, the second antenna 203, the third antenna 205, the fourth antenna 207, and the fifth antenna 209) (e.g., the antenna module 197). The electronic device 200 may include a control unit 220 (e.g., the processor 120 of FIG. 1). The control unit 220 may control an audio signal by a terminal and an audio module 290 (e.g., the audio module 170). The electronic device 200 may include the audio module 290. The audio module 290 may process and amplify the audio signal. The electronic device 200 may include an audio amplifier 230. The audio amplifier 230 may be an amplifier that amplifies an input signal. The electronic device 200 may include an audio processing unit 250. The audio processing unit 250 may convert a sound wave signal into an electrical signal, or convert an electrical signal into a sound wave signal. The electronic device 200 may include a determination unit 240. The determination unit 240 may identify a noise level and a wireless communication state of the audio signal. The determination unit 240 may include a communication state determination unit 260 and an audio signal determination unit 270. The electronic device 200 may include the communication state determination unit 260. The communication state determination unit 260 may determine channel quality and a transmission power. The electronic device 200 may include an audio signal determination unit 270. The audio signal determination unit 270 may identify the noise level of the audio signal. The switch 280 may change a ground circuit of the audio module. The electronic device may include a plurality of antenna ground circuits (a first antenna ground circuit 281, a second antenna ground circuit 283, a third antenna ground circuit 285, a fourth antenna ground circuit 287, and a fifth antenna ground circuit 289). The first antenna ground circuit 281 may correspond to the first antenna 201. The second antenna ground circuit 283 may correspond to the second antenna 203. The third antenna ground circuit 285 may correspond to the third antenna 205. The fourth antenna ground circuit 287 may correspond to the fourth antenna 207. The fifth antenna ground circuit 289 may correspond to the fifth antenna 209. For example, the electronic device 101 includes a housing including a metal frame. The metal frame may include conductive portions and non-conductive portions. As at least a portion of the metal frame is segmented due to a non-conductive portion, a conductive portion may be positioned between the non-conductive portions. The conductive portion may be used as an antenna configured to radiate and/or receive a signal. The electronic device 101 may use at least a portion of the conductive portion as an antenna ground for the antenna.

According to embodiments, the wireless communication unit 210 may perform wireless communication with another electronic device or a base station, and identify a communication state while the wireless communication is performed. The wireless communication unit 210 may perform functions for transmitting and receiving a signal through a wireless channel. For example, the wireless communication unit 210 performs a conversion function between a baseband signal and a bit sequence according to a physical layer standard of a system. For example, when transmitting data, the wireless communication unit 210 generates complex symbols by encoding and modulating the transmitted bit sequence. In addition, when receiving data, the wireless communication unit 210 may restore the received bit sequence by demodulating and decoding the baseband signal. Furthermore, the wireless communication unit 210 may up-convert the baseband signal into a radio frequency (RF) band signal, transmit it through the antenna, and down-convert the RF band signal received through the antenna into the baseband signal.

To this end, the wireless communication unit 210 may include a transmission filter, a reception filter, an amplifier, a mixer, an oscillator, a digital to analog convertor (DAC), and/or an analog to digital convertor (ADC). Also, the wireless communication unit 210 may include a plurality of transmission/reception paths. Furthermore, the wireless communication unit 210 may include a plurality of antennas. In terms of hardware, the wireless communication unit 210 may be configured with a digital unit and an analog unit, and the analog unit may be configured with a plurality of sub-units according to an operating power or an operating frequency.

The wireless communication unit 210 may transmit and receive a signal. For example, the wireless communication unit 210 transmits a synchronization signal, a reference signal, system information, a message, control information, or data.

The wireless communication unit 210 may transmit and receive the signal as described above. Accordingly, all or a portion of the wireless communication unit 210 may be referred to as a 'transmission unit', a 'reception unit', or a 'transmission/reception unit'. In addition, in the following description, transmission and reception performed through the wireless channel may be used to include processing as described above performed by the wireless communication unit 210.

The control unit 220 may perform an operation such as identification and transmission of an audio signal and control of a circuit including a switch. The switch 280 may change a ground circuit of the audio module from an audio module ground circuit to an antenna ground circuit. The switch 280 may change the ground circuit of the audio module from one of at least one antenna ground circuit to another one of the at least one antenna ground circuit. The antenna ground circuit being connected through the switch 280 may indicate that the switch 280 is electrically connected to the conductive portion of the metal frame of the electronic device 101.

The control unit 220 may control overall operations of the electronic device 200. For example, the control unit 220 transmits and receives a signal through the wireless communication unit 210. Furthermore, the control unit 220 may record and read data. In addition, the control unit 220 may perform functions of a protocol stack required by a communication standard. To this end, the control unit 220 may include at least one processor or a microprocessor, or may be a portion of the processor. In addition, a portion of the wireless communication unit 210 and the control unit 220 may be included in a communication processor included in the processor. The control unit 220 may include various modules for performing communication.

The determination unit 240 may be included in the processor. The processor may include an application processor. The determination unit 240 may include the communication state determination unit 260 and the audio signal determination unit 270. The communication state determination unit 260 may be included in the communication processor. The audio signal determination unit 270 may be included in the application processor.

Figure 3A:
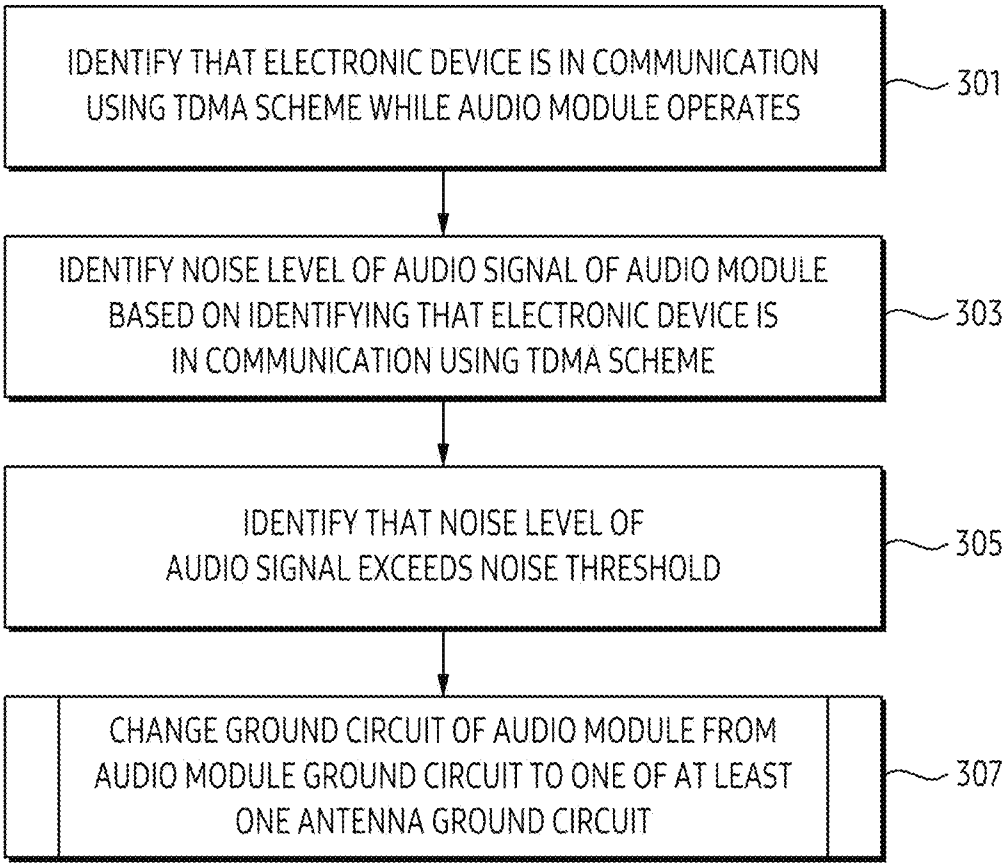
FIG. 3A illustrates a flow of an operation of an electronic device for changing a ground circuit of an audio module, according to an embodiment of the disclosure.
Figure 3B:
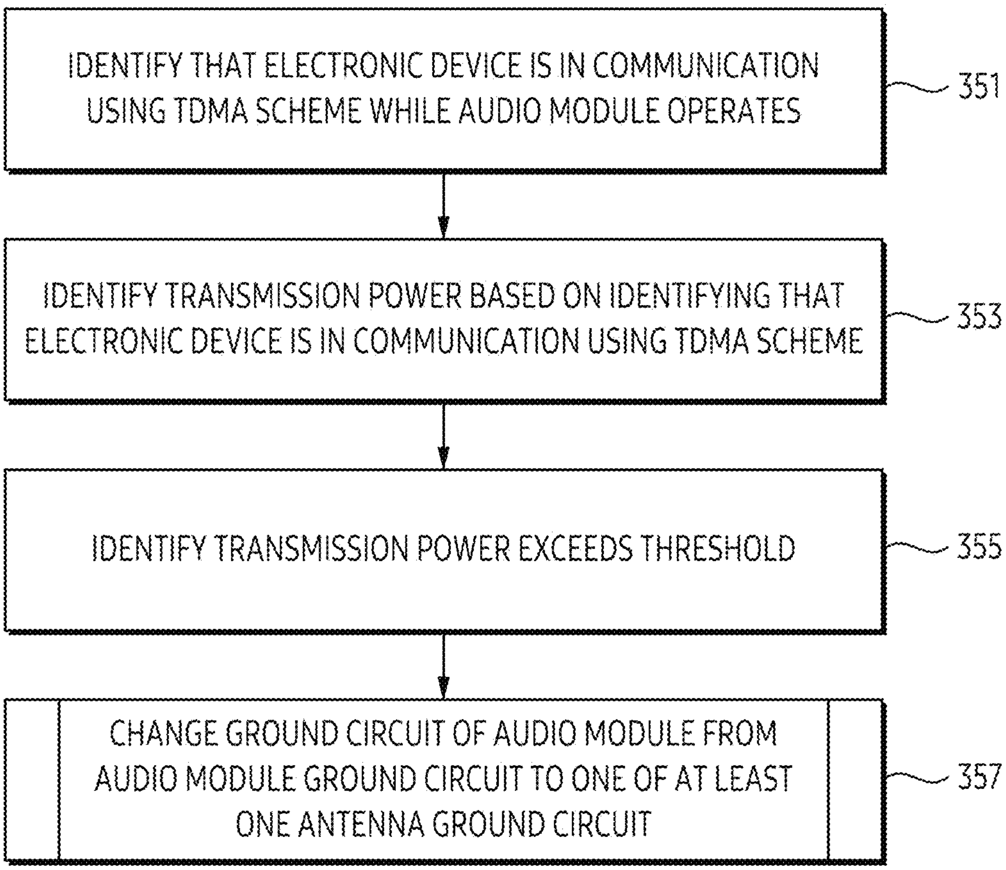
FIG. 3B illustrates a flow of an operation of an electronic device for changing a ground circuit of an audio module, according to an embodiment of the disclosure.

FIGS. 3A and 3B illustrate a flow of an operation of an electronic device for changing a ground circuit of an audio module according to various embodiments of the disclosure. The operation flow of the electronic device (e.g., the electronic device 101 of FIG. 1) may be performed by at least one processor (e.g., the processor 120 of FIG. 1).

Referring to FIG. 3A, in operation 301, the at least one processor (e.g., the processor 120 of FIG. 1) may identify that the electronic device (e.g., the electronic device 101 of FIG. 1) is in communication using a time division multiple access (TDMA) scheme and/or a time division duplexing (TDD) scheme while the audio module operates. The TDMA refers to a communication scheme transmitting and receiving a signal between the electronic device and the base station as a time section for transmitting the signal and a time section for receiving the signal are divided. The TDD refers to a wireless communication scheme in which a resource assigned to the transmitted signal and a resource assigned to the received signal are distinguished in a time domain, that is, a wireless communication scheme in which a transmission time resource and a reception time resource are distinguished. In case that wireless communication is performed using the TDMA scheme (or the TDD scheme), TDMA noise (or TDD noise) may occur as noise for an audio signal of the electronic device performing the wireless communication. The TDMA noise (or the TDD noise) may occur because more power is consumed in the time section for transmitting the signal than in the time section for receiving the signal. The electronic device 101 may repeat transmission and reception during a predetermined time section. A frequency corresponding to a repetition period in which a transmission section and a reception section are changed may at least partially overlap a frequency band of the audio signal. The electronic device according to various embodiments may solve the above-described problem through the ground circuit. Various embodiments of the disclosure may reduce the noise when the time division multiple access (TDMA) noise (or the time division duplex (TDD) noise) (hereinafter, the noise) occurs. Therefore, according to various embodiments of the disclosure, in order to identify whether there is a possibility of the TDMA noise (or the TDD noise) occurring, at least one processor 120 may identify that the electronic device is in communication using the TDMA scheme (or the TDD scheme) while the audio module operates.

According to an embodiment, the TDMA noise (or the TDD noise) may occur while the audio module operates, and the wireless communication is performed using the TDMA scheme (or the TDD scheme). Therefore, in order to identify whether there is a possibility of the TDMA noise (or the TDD noise) occurring, the at least one processor 120 may identify that the electronic device is in the TDMA scheme (or the TDD scheme) while the audio module operates.

In operation 303, the at least one processor 120 may identify a noise level of the audio signal of the audio module based on identifying that the electronic device is in time division multiple access (TDMA) communication (or time division duplex (TDD) communication).

According to an embodiment, the time division multiple access (TDMA) noise (or the time division duplex (TDD) noise) may occur while the audio module operates and the wireless communication is performed using the time division multiple access (TDMA) scheme (or the time division duplex (TDD) scheme). However, although the audio module operates and the wireless communication is performed using the TDMA scheme (or the TDD scheme), the noise may occur to be less than or equal to a designated value (e.g., a noise threshold). Therefore, the at least one processor 120 may identify a degree of a noise occurrence by identifying the noise level of the audio signal of the audio module. The noise level of the audio signal may be a designated step according to an intensity of the noise signal.

According to an embodiment, in order to identify the noise level of the audio signal, the at least one processor 120 may pass the audio signal through a filter of a designated noise frequency band. For example, the designated noise frequency band is a frequency band in which the TDMA noise (or the TDD noise) mainly occurs. The designated noise frequency band may range from about 200 hertz (Hz) to about 300 Hz.

According to an embodiment, the at least one processor 120 may identify the noise level based on the intensity of the audio signal that has passed through the filter of the designated noise frequency band. For example, in case that the intensity of the audio signal passing through the filter of the designated noise frequency band is less than a first reference value, the at least one processor 120 may identify the noise level of the audio signal as the first level. In case that the intensity of the audio signal passing through the filter of the designated noise frequency band is greater than or equal to the first reference value and less than a second reference value, the at least one processor 120 may identify the noise level of the audio signal as a second level. In case that the intensity of the audio signal passing through the filter of the designated noise frequency band is greater than or equal to the second reference value, the at least one processor 120 may identify the noise level of the audio signal as a third level.

In operation 305, the at least one processor 120 may identify that the noise level of the audio signal exceeds the noise threshold. In case that the noise level of the audio signal exceeds the noise threshold, the at least one processor 120 may perform an operation for reducing the noise. The noise threshold may be the first reference value. The at least one processor 120 may perform the operation for noise reduction based on identifying that the noise level of the audio signal exceeds the first level.

In operation 307, the at least one processor 120 may change a ground circuit of the audio module from an audio module ground circuit to one of at least one antenna ground circuit. The ground circuit means a circuit for setting a reference point of a voltage. As the reference point of the voltage is set, noise may be reduced. The ground circuit for reducing the noise of the audio module may include the audio module ground circuit. The audio module ground circuit may be the ground circuit for the audio module. The ground circuit for reducing the noise of the audio module may include the antenna ground circuit. The antenna ground circuit may be used for an antenna. The antenna ground circuit may correspond to one antenna. For example, the electronic device 101 includes a housing including a metal frame. The metal frame may be used as a ground. The ground circuit of the audio module may be electrically connected to at least a portion of the metal frame. For example, the metal frame includes conductive portions and non-conductive portions. Non-conductive portion may be formed between the conductive portions. The conductive portion may be positioned between the non-conductive portions. As the non-conductive portions are formed, the metal frame may include one or more segment units. The electronic device 101 may use the conductive portion as the antenna.

The electronic device 101 may include at least one antenna. In this case, the electronic device 101 may include a ground circuit for each antenna. Accordingly, the ground circuit for reducing the noise of the audio module may be at least a portion of the ground circuit for each antenna. A noise reduction performance of the ground circuit may be improved as a ground area is larger. Due to influence of product miniaturization, a size of the audio module ground circuit may not be sufficient to reduce noise (e.g., the TDMA noise (or the TDD noise)) for the audio signal of the audio module. The antenna ground circuit may be sufficiently larger than an audio module ground circuit area to remove the noise. Therefore, a noise reduction performance of the antenna ground circuit may be higher than a noise reduction performance of the audio module ground circuit. A size of a ground circuit area of a plurality of antenna ground circuits may also be different for each antenna ground circuit. Therefore, a noise reduction performance may be different for each antenna ground circuit.

According to an embodiment, the at least one processor 120 may change the ground circuit of the audio module from the audio module ground circuit to an antenna ground circuit corresponding to a noise level of the audio signal. For example, the at least one processor 120 changes the ground circuit of the audio module from the audio module ground circuit to a first antenna ground circuit corresponding to an audio signal of the second level. For example, the at least one processor 120 changes the ground circuit of the audio module from the audio module ground circuit to a second antenna ground circuit corresponding to an audio signal of the third level.

Referring to FIG. 3B, in operation 351, the at least one processor 120 may identify that the electronic device 101 is in communication using the time division multiple access (TDMA)/time division duplexing (TDD) scheme while the audio module operates. The TDD refers to a wireless communication scheme for distinguishing a reception channel and a transmission channel based on a time-divided signal. The TDMA refers to a communication scheme transmitting and receiving a signal between the electronic device and the base station as a time section for transmitting the signal and a time section for receiving the signal are divided. In case that the wireless communication is performed using the TDMA scheme (or the TDD scheme), the TDMA noise (or the TDD noise) may occur as noise for an audio signal of the electronic device performing the wireless communication. The TDMA noise (or the TDD noise) may occur because more power is consumed in the time section for transmitting the signal than in the time section for receiving the signal. The electronic device 101 may repeat transmission and reception during a predetermined time section. A frequency corresponding to a repetition period in which a transmission section and a reception section are changed may at least partially overlap a frequency band of the audio signal. The electronic device according to various embodiments may solve the above-described problem through a ground circuit. Various embodiments of the disclosure may reduce the noise when the time division multiple access (TDMA) noise (or the time division duplex (TDD) noise) occurs. Therefore, according to embodiments of the disclosure, in order to identify whether there is a possibility of the TDMA noise (or the TDD noise) occurring, the at least one processor 120 may identify that the electronic device is in the communication using the TDMA scheme (or the TDD scheme) while the audio module operates.

According to an embodiment, the TDMA noise (or the TDD noise) may occur while the audio module operates, and the wireless communication is performed using the TDMA scheme (or the TDD scheme). Therefore, in order to identify whether there is a possibility of the TDMA noise (or the TDD noise) occurring, the at least one processor 120 may identify that the electronic device is in the TDMA scheme (or the TDD scheme) while the audio module operates.

In operation 353, the at least one processor 120 may identify a transmission power based on identifying that the electronic device is in time division multiple access (TDMA) communication (or time division duplex (TDD) communication.

According to an embodiment, the time division multiple access (TDMA) noise (or the time division duplex (TDD) noise) may occur while the audio module operates and the wireless communication is performed using the time division multiple access (TDMA) scheme (or the time division duplex (TDD) scheme). The at least one processor 120 may identify a degree of a possibility of a noise occurrence by identifying the transmission power. The noise level of the audio signal may be a designated step according to an intensity of the noise signal.

In operation 355, the at least one processor 120 may identify that the transmission power exceeds a threshold. In case that the transmission power exceeds the threshold, the at least one processor 120 may perform an operation for reducing the noise.

In operation 357, the at least one processor 120 may change a ground circuit of the audio module from an audio module ground circuit to one of at least one antenna ground circuit. The ground circuit means a circuit for setting a reference point of a voltage. As the reference point of the voltage is set, noise may be reduced. The ground circuit for reducing the noise of the audio module may include the audio module ground circuit. The audio module ground circuit may be the ground circuit for the audio module. The ground circuit for reducing the noise of the audio module may include an antenna ground circuit. The antenna ground circuit may be used for an antenna. The antenna ground circuit may correspond to one antenna. For example, the electronic device 101 includes a housing including a metal frame. The metal frame may be used as a ground. The ground circuit of the audio module may be electrically connected to at least a portion of the metal frame. For example, the metal frame includes conductive portions and non-conductive portions. Non-conductive portion may be formed between the conductive portions. The conductive portion may be positioned between the non-conductive portions. As the non-conductive portions are formed, the metal frame may include one or more segment units. The electronic device 101 may use the conductive portion as the antenna.

The electronic device 101 may include at least one antenna. In this case, the electronic device 101 may include a ground circuit for each antenna. Accordingly, the ground circuit for reducing the noise of the audio module may be at least a portion of the ground circuit for each antenna. A noise reduction performance of the ground circuit may be improved as a ground area is larger. Due to influence of product miniaturization, a size of the audio module ground circuit may not be sufficient to reduce the noise (e.g., the TDMA noise (or the TDD noise)) for the audio signal of the audio module. The antenna ground circuit may be sufficiently larger than an audio module ground circuit area to remove the noise. Therefore, a noise reduction performance of the antenna ground circuit may be higher than a noise reduction performance of the audio module ground circuit. A size of a ground circuit area of a plurality of antenna ground circuits may also be different for each antenna ground circuit. Therefore, a noise reduction performance may be different for each antenna ground circuit.

In FIGS. 3A and 3B, it is illustrated that the at least one processor 120 uses a single antenna ground circuit as the ground circuit of the audio module, but the embodiments of the disclosure are not limited thereto. According to an embodiment, the at least one processor may use a plurality of antenna ground circuits as the ground circuit of the audio module.

Figure 4:
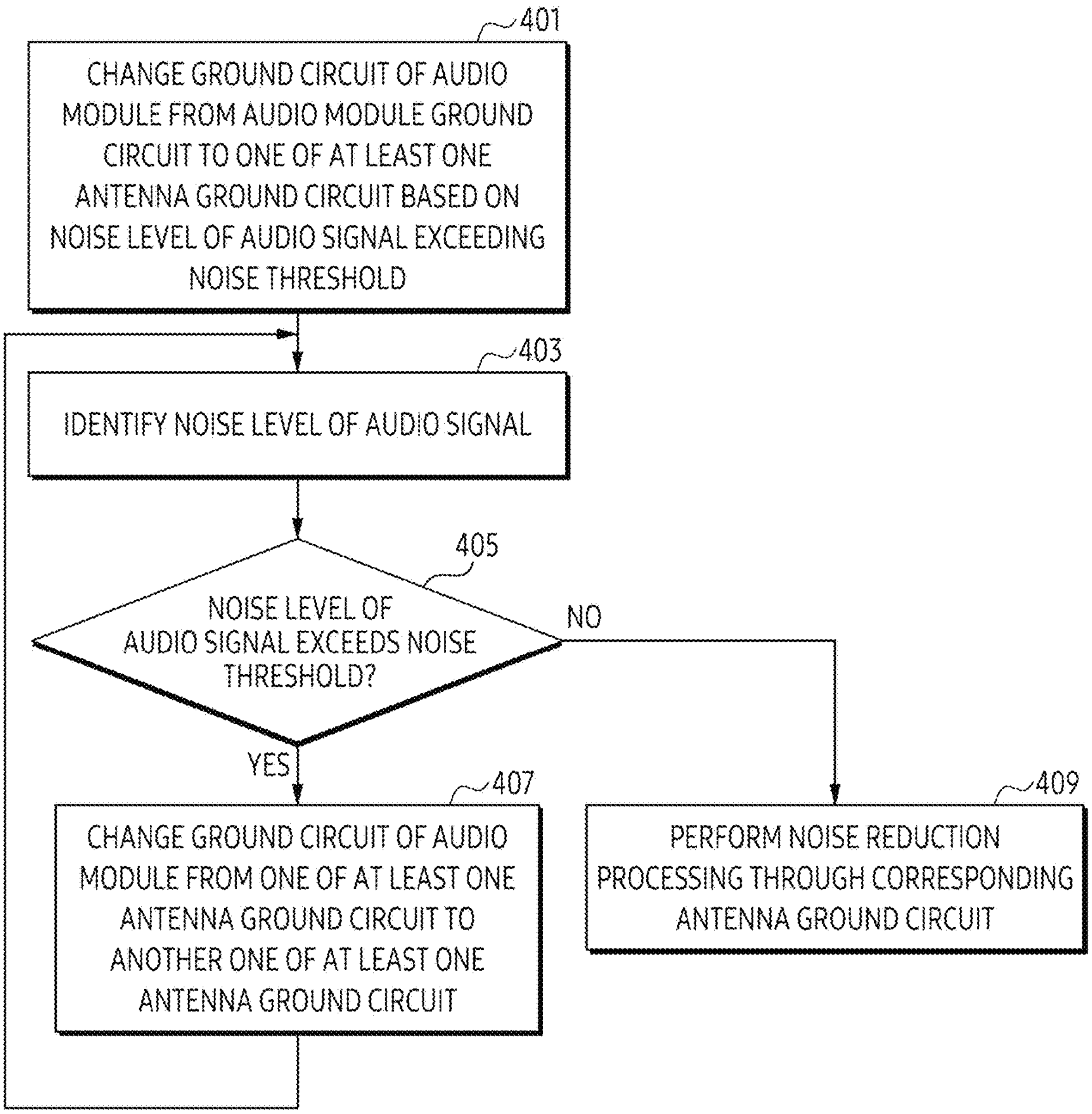
FIG. 4 illustrates a flow of an operation of an electronic device for performing noise reduction processing based on an antenna ground circuit with a noise level less than or equal to a threshold, according to an embodiment of the disclosure.

Hereinafter, operations for power efficiency and time efficiency will be described in FIG. 4. FIG. 4 illustrates a flow of an operation of selecting an antenna ground circuit with a noise level less than or equal to a noise threshold among at least one antenna ground circuit according to an embodiment of the disclosure.

Figure 5:
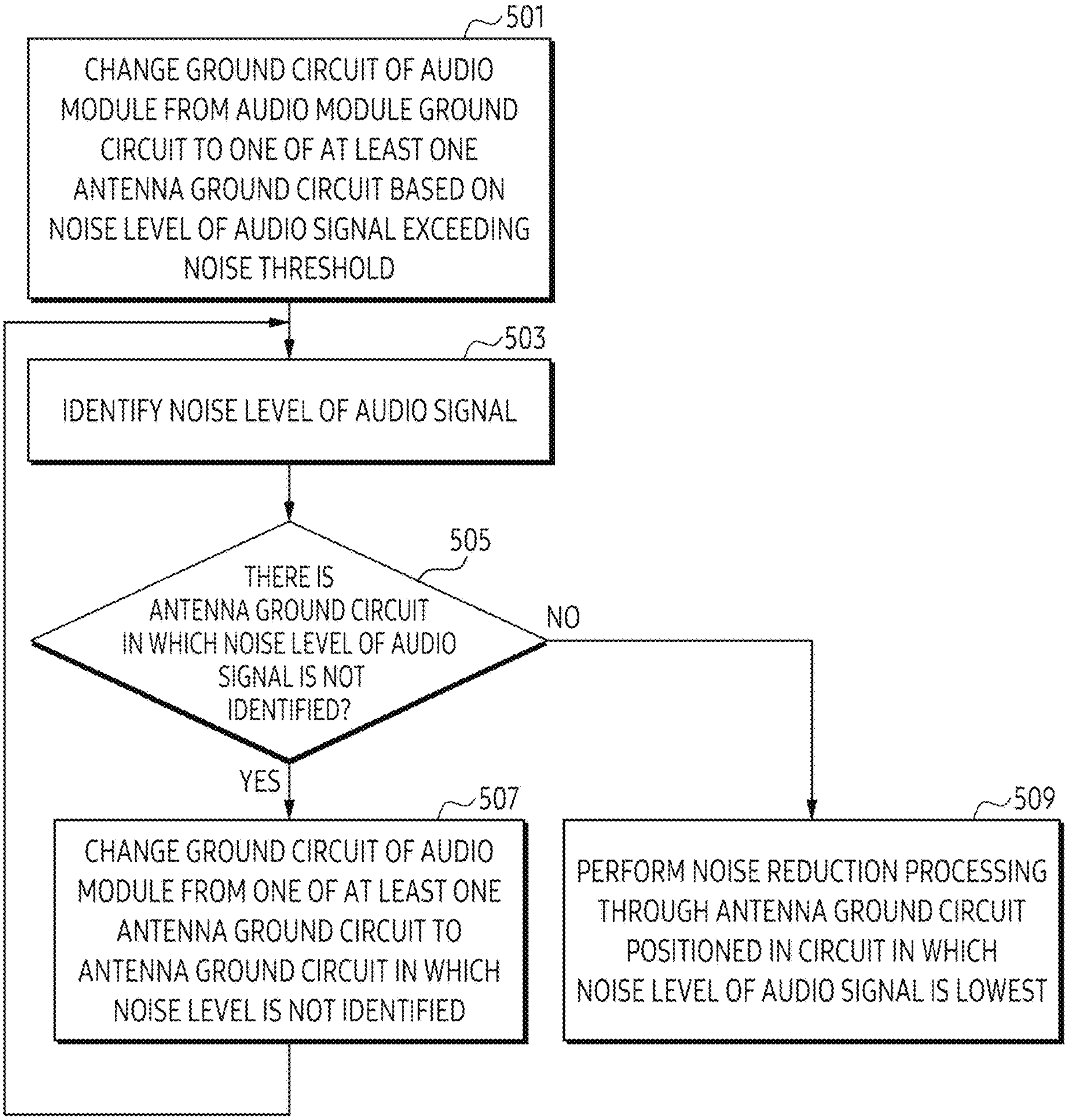
FIG. 5 illustrates a flow of an operation of an electronic device for performing noise reduction processing based on an antenna ground circuit with a lowest noise level, according to an embodiment of the disclosure.

Hereinafter, operations for maximizing a noise reduction performance will be described in FIG. 5. FIG. 5 illustrates a flow of an operation for selecting an antenna ground circuit with a lowest noise level among at least one antenna ground circuit according to an embodiment of the disclosure.

FIG. 4 illustrates a flow of an operation of an electronic device for performing noise reduction processing based on an antenna ground circuit with a noise level less than or equal to a threshold, according to an embodiment of the disclosure. In FIG. 4, operations of an electronic device 101 for changing a ground circuit of an audio module to one of at least one antenna ground circuit are described. Operations of FIG. 4 may correspond to the operation 307 of the electronic device of FIG. 3A.

Referring to FIG. 4, in operation 401, at least one processor (e.g., the processor 120 in FIG. 1) may change the ground circuit of the audio module from an audio module ground circuit to one of the at least one antenna ground circuit based on a noise level of an audio signal exceeding a noise threshold. The ground circuit means a circuit for setting a reference point of a voltage. As the reference point of the voltage is set, noise may be reduced. The ground circuit for reducing the noise of the audio module may include the audio module ground circuit. The audio module ground circuit may be the ground circuit for the audio module. The ground circuit for reducing the noise of the audio module may include an antenna ground circuit. The antenna ground circuit may be used for an antenna. The antenna ground circuit may correspond to one antenna. The electronic device 101 may include a plurality of antennas. In this case, the electronic device 101 may include a ground circuit for each antenna. Accordingly, the ground circuit for reducing the noise of the audio module may be at least a portion of the ground circuit for each antenna.

A noise reduction performance of the ground circuit may be improved as a ground area is larger. Due to influence of product miniaturization, a size of the audio module ground circuit may not be sufficient to reduce noise (e.g., TDMA noise (or TDD noise)) for the audio signal of the audio module. The antenna ground circuit may be sufficiently larger than an audio module ground circuit area to remove the noise. Therefore, a noise reduction performance of the antenna ground circuit may be higher than a noise reduction performance of the audio module ground circuit. A size of a ground circuit area of a plurality of antenna ground circuits may also be different for each antenna ground circuit. Therefore, a noise reduction performance may be different for each antenna ground circuit.

At least one processor 120 may change from the audio module ground circuit to one of the at least one antenna ground circuit. The ground circuit of the audio module may be changed from the audio module ground circuit to a portion of the at least one antenna ground circuit through a switch (e.g., the switch 280 of FIG. 2). According to an embodiment, the ground circuit of the audio module may be connected to one or more antenna ground circuits through the switch 280. According to an embodiment, the antenna ground circuit may be performing wireless communication. According to another embodiment, the antenna ground circuit may not be performing the wireless communication. The switch 280 may have a plurality of contacts. The switch 280 may be referred to as a ground switch.

In operation 403, the at least one processor 120 may identify the noise level of the audio signal. The at least one processor 120 may identify the noise level of the audio signal to identify the noise reduction performance of the antenna ground circuit. According to an embodiment, in order to identify the noise level of the audio signal, the at least one processor 120 may pass the audio signal through a filter of a designated noise frequency band.

In operation 405, the at least one processor 120 may identify whether the noise level of the audio signal exceeds the noise threshold. If the noise level is not reduced to be less than or equal to the noise threshold even though the ground circuit of the audio module is changed to the antenna ground circuit, it is because the at least one processor 120 needs to change the ground circuit of the audio module to another antenna ground circuit. In case that the noise level of the audio signal exceeds the noise threshold, the at least one processor 120 may perform operation 407. In case that the noise level of the audio signal does not exceed the noise threshold, the at least one processor 120 may perform operation 409. The noise threshold may be set to secure a required noise reduction performance. For example, the noise threshold is set to a fixed value regardless of a characteristic (e.g., a frequency, or an intensity) of the audio signal of the audio module. For example, the noise threshold is obtained based on the characteristic (e.g., the frequency, or the intensity) of the audio signal of the audio module. If the noise level is not reduced to be less than or equal to the noise threshold even though the ground circuit of the audio module is changed to the antenna ground circuit, the at least one processor 120 may change the ground circuit of the audio module to the other antenna ground circuit.

In operation 407, the at least one processor 120 may change the ground circuit of the audio module from one of the at least one antenna ground circuit to another one of the at least one antenna ground circuit. It is because a noise reduction performance according to the antenna ground circuit may be different. According to an embodiment, the noise reduction performance may be different according to a characteristic of each antenna ground circuit. For example, the noise reduction performance is different according to an area of each antenna ground circuit. For example, the noise reduction performance is different according to a position of each antenna ground circuit. For example, the noise reduction performance is different according to a configuration of each antenna ground circuit. The at least one processor 120 may identify the noise level of the audio signal after changing the ground circuit of the audio module. The at least one processor 120 may identify whether the noise level of the audio signal exceeds the noise threshold. If the noise level is not reduced to be less than or equal to the noise threshold even though the ground circuit of the audio module is changed to the antenna ground circuit, it is because the at least one processor 120 needs to change the ground circuit of the audio module to the other antenna ground circuit.

The ground circuit of the audio module may be changed from one of the at least one antenna ground circuit to the other of the at least one antenna ground circuit through the switch 280. The switch 280 may have the plurality of contacts. The switch 280 may be referred to as the ground switch.

In operation 409, the at least one processor 120 may perform noise reduction processing through a corresponding antenna ground circuit. It is because the noise reduction performance of the ground circuit of the audio module is secured, in case that the noise level of the audio signal is less than or equal to the noise threshold. Therefore, the at least one processor 120 may perform the noise reduction processing through an antenna ground circuit indicating the noise level of the audio signal less than or equal to the noise threshold.

In FIG. 4, it is illustrated that the at least one processor uses a single antenna ground circuit as the ground circuit of the audio module, but the embodiments of the disclosure are not limited thereto. According to an embodiment, the at least one processor may use a plurality of antenna ground circuits as the ground circuit of the audio module.

In FIG. 4, operations for the power efficiency and the time efficiency are described. At a noise level of an audio signal of a first antenna ground circuit with a value less than or equal to the noise threshold, a noise reduction processing method is described. If a noise level less than or equal to a threshold is identified, the electronic device 101 may no longer identify a noise level of an audio signal of a second antenna ground circuit for the power efficiency and the time efficiency. For example, the electronic device 101 stores information on the noise level of the audio signal of the first antenna ground circuit with a value less than or equal to the noise threshold in memory (e.g., the memory 130 of FIG. 1). However, the embodiments of the disclosure are not limited thereto. In order to maximize the noise reduction performance, the electronic device 101 may identify a noise level of an audio signal of each antenna ground circuit among all antenna ground circuits. Hereinafter, in FIG. 5, operations for maximizing the noise reduction performance will be described.

FIG. 5 illustrates a flow of an operation of an electronic device for performing noise reduction processing based on an antenna ground circuit with a lowest noise level, according to an embodiment of the disclosure. In FIG. 5, operations of an electronic device 101 for changing a ground circuit of an audio module to one of at least one antenna ground circuit are described. The operations of FIG. 5 may correspond to the operation 307 of the electronic device of FIG. 3A.

Referring to FIG. 5, in operation 501, at least one processor (e.g., the processor 120 of FIG. 1) may identify a noise level of an audio signal. In operation 501, at least one processor 120 may change the ground circuit of the audio module from an audio module ground circuit to one of at least one ground circuit based on the noise level of the audio signal exceeding a noise threshold. The ground circuit means a circuit for setting a reference point of a voltage. As the reference point of the voltage is set, noise may be reduced. The ground circuit for reducing the noise of the audio module may include the audio module ground circuit. The audio module ground circuit may be the ground circuit for the audio module. The ground circuit for reducing the noise of the audio module may include an antenna ground circuit. The antenna ground circuit may be used for an antenna. The antenna ground circuit may correspond to one antenna. The electronic device 101 may include a plurality of antennas. In this case, the electronic device 101 may include a ground circuit for each antenna. Accordingly, the ground circuit for reducing the noise of the audio module may be at least a portion of the ground circuit for each antenna. A noise reduction performance of the ground circuit may be improved as a ground area is larger. Due to influence of product miniaturization, a size of the audio module ground circuit may not be sufficient to reduce noise (e.g., TDMA noise (or TDD noise)) for the audio signal of the audio module. The antenna ground circuit may be sufficiently larger than an audio module ground circuit area to remove the noise. Therefore, a noise reduction performance of the antenna ground circuit may be higher than a noise reduction performance of the audio module ground circuit. A size of a ground circuit area of a plurality of antenna ground circuits may also be different for each antenna ground circuit. Therefore, a noise reduction performance may be different for each antenna ground circuit.

The at least one processor 120 may change from the audio module ground circuit to one of the at least one antenna ground circuit. The ground circuit of the audio module may be changed from the audio module ground circuit to one of the at least one antenna ground circuit through a switch (e.g., the switch 280 of FIG. 2). The switch 280 may have a plurality of contacts. The switch 280 may be referred to as a ground switch.

In operation 503, the at least one processor 120 may identify the noise level of the audio signal. The at least one processor 120 may identify the noise level of the audio signal to identify the noise reduction performance of the antenna ground circuit. The at least one processor 120 may measure a noise level of an audio signal of all antenna ground circuits.

In operation 505, the at least one processor 120 may identify whether there is an antenna ground circuit in which the noise level of the audio signal is not identified. It is to identify noise levels of audio signals corresponding to each antenna ground circuit in order to maximize the noise reduction performance. In case that there is an antenna ground circuit in which the noise level of the audio signal is not identified, the at least one processor 120 may perform operation 507. In case that there is no antenna ground circuit in which the noise level of the audio signal is not identified, the at least one processor 120 may perform operation 509.

In operation 507, the at least one processor 120 may change the ground circuit of the audio module from one of the at least one antenna ground circuit to the antenna ground circuit in which the noise level is not identified.

According to an embodiment, in case that there is the antenna ground circuit in which the noise level of the audio signal is not identified, the at least one processor 120 may change the ground circuit of the audio module to the antenna ground circuit in which the noise level is not identified. The at least one processor may identify a noise level of an audio signal of all antenna ground circuits to maximize the noise reduction performance.

In operation 509, the at least one processor 120 may perform the noise reduction processing through an antenna ground circuit positioned in a circuit in which the noise level of the audio signal is lowest. According to an embodiment, this is because the noise reduction performance of the circuit in which the noise level of the audio signal is the lowest is the highest. Therefore, the at least one processor 120 may perform the noise reduction processing through the antenna ground circuit in which the noise level is the lowest in order to maximize the noise reduction performance.

In FIG. 5, it is illustrated that the at least one processor uses a single antenna ground circuit as the ground circuit of the audio module, but the embodiments of the disclosure are not limited thereto. According to an embodiment, the at least one processor may use a plurality of antenna ground circuits as the ground circuit of the audio module.

Figure 6:
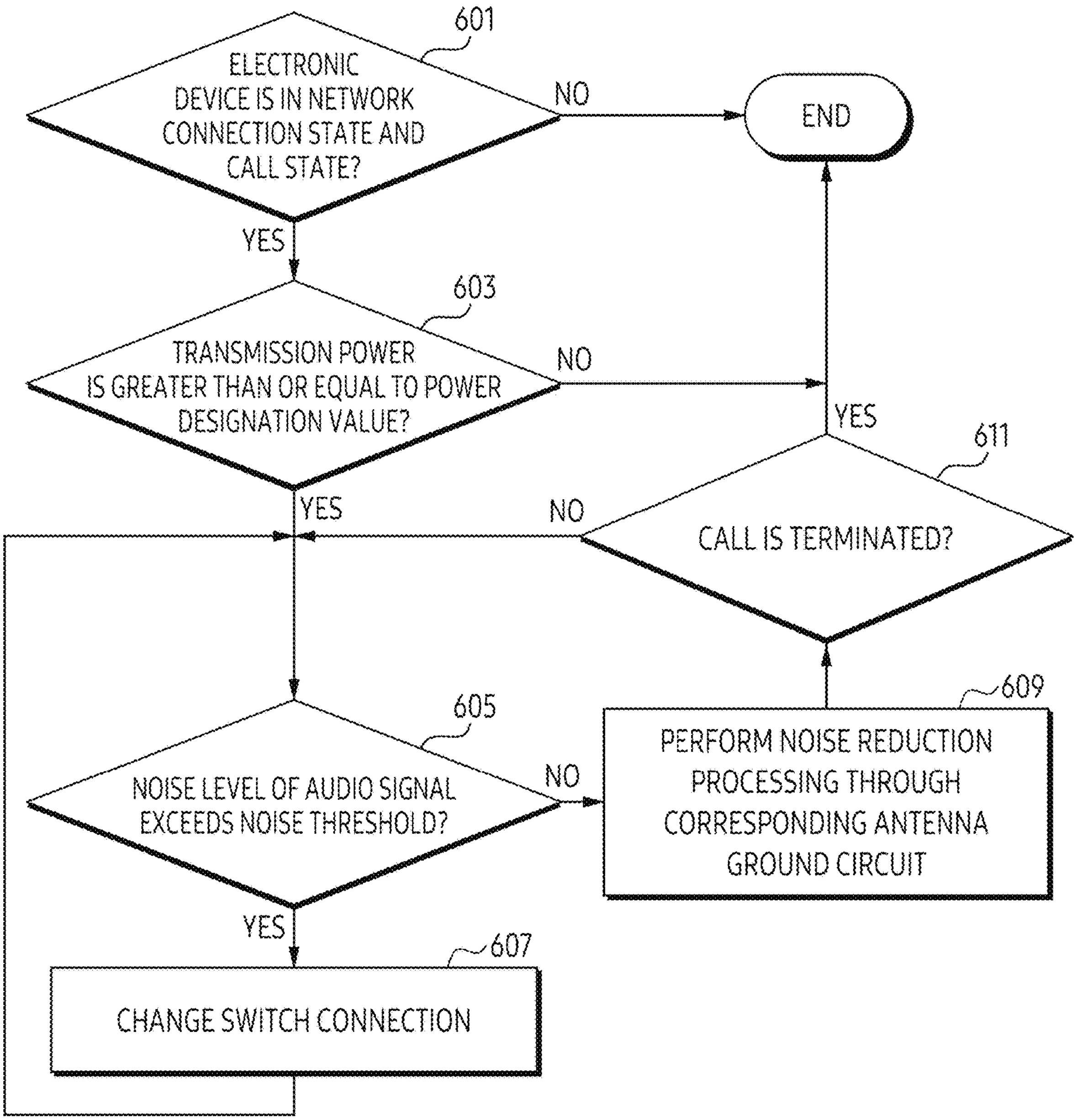
FIG. 6 illustrates a flow of an operation of an electronic device for performing noise reduction processing when performing a call while being connected to a network, according to an embodiment of the disclosure.

FIG. 6 illustrates a flow of an operation of an electronic device for performing noise reduction processing when performing a call while being connected to a network, according to an embodiment of the disclosure. The electronic device (e.g., the electronic device 101 of FIG. 1) may include a processor (the processor 120 of FIG. 1).

Referring to FIG. 6, in operation 601, at least one processor 120 may identify that the electronic device 101 is in a network connection state and a call state. In the network connection state, the electronic device 101 and a base station may be connected using a time division multiple access (TDMA) scheme (or a time division duplex (TDD) scheme). The at least one processor 120 may identify that the electronic device 101 is in the call state.

In case that the electronic device 101 is in the network connection state and the call state, the at least one processor 120 may perform operation 603. In case that the electronic device is in the network connection state and is not in the call state, the at least one processor 120 may terminate an operation of the electronic device for performing noise reduction processing.

According to an embodiment, the at least one processor 120 may identify that the electronic device 101 is in the network connection state using the time division multiple access (TDMA) scheme (or the time division duplex (TDD) scheme). In addition, the at least one processor 120 may identify that the electronic device 101 is in the call state. The TDMA refers to a communication scheme transmitting and receiving a signal between the electronic device and the base station as a time section for transmitting the signal and a time section for receiving the signal are divided. In case that wireless communication is performed using the TDMA scheme (or the TDD scheme), TDMA noise (or TDD noise) may occur to an audio signal of the electronic device performing the wireless communication. The TDMA noise (or the TDD noise) may occur because more power is consumed in a time section for transmitting a signal than in a time section for receiving a signal. The electronic device 101 may repeat transmission and reception during a predetermined time section. A frequency corresponding to a repetition period in which a transmission section and a reception section are changed may at least partially overlap a frequency band of the audio signal. The TDMA noise (or the TDD noise) may be a constant frequency corresponding to a transmission/reception period. The electronic device according to embodiments may solve the above-described problem through a ground circuit. When the TDMA noise (or the TDD noise) (hereinafter, a noise) occurs, the embodiments of the disclosure may reduce the noise. Therefore, according to embodiments of the disclosure, in order to identify whether there is a possibility of the TDMA noise (or the TDD noise) occurring, the at least one processor 120 may identify whether the electronic device 101 is in the network connection state or the call state.

According to an embodiment, the TDMA noise (or the TDD noise) may occur, while an audio module operates (e.g., the electronic device 101 is performing the call) and while the electronic device is in a network connection using the TDMA scheme (or the TDD scheme). Therefore, in order to identify the possibility of the noise occurring, the at least one processor 120 may identify whether the electronic device 101 is in the network connection state using the TDMA scheme (or the TDD scheme), and whether the electronic device 101 is in the call state.

The at least one processor 120 may identify that the electronic device 101 is in the network connection state using the TDMA scheme (or the TDD scheme). The at least one processor 120 may identify that the electronic device is in the call state. In case that the electronic device 101 is in the network connection state and is performing the call, the at least one processor 120 may identify that the noise occurs.

In the operation 603, the at least one processor 120 may identify whether a transmission power exceeds a power designation value. A transmission power means a power consumed by the electronic device 101 for the wireless communication.

According to an embodiment, in case that the transmission power exceeds the power designation value, a power drop value may increase, thereby increasing the noise. The transmission power may be greater as a signal intensity (e.g., a received signal strength indicator (RSSI)) is smaller. The RSSI may be a signal reception intensity. As the RSSI becomes smaller, it may be a weak electric field state. As it becomes the weak electric field state, the transmission power may be greater. Accordingly, the at least one processor 120 may identify magnitude of the transmission power by using the RSSI.

In case that the transmission power exceeds the power designation value, the at least one processor 120 may perform operation 605. In case that the transmission power is less than or equal to the power designation value, the at least one processor 120 may terminate a monitoring operation.

In the operation 605, the at least one processor 120 may identify whether a noise level of the audio signal exceeds a noise threshold. If a noise level is not reduced to be less than or equal to the noise threshold even though a ground circuit of the audio module is changed to an antenna ground circuit, it is because the at least one processor 120 needs to change the ground circuit of the audio module to another antenna ground circuit. For example, the noise threshold is −85 decibel (dB). In case that the noise level of the audio signal exceeds the noise threshold, the at least one processor 120 may perform operation 607. In case that the noise level of the audio signal is less than or equal to the noise threshold, the at least one processor 120 may perform operation 609. The noise threshold may be set to secure a required noise reduction performance. For example, the noise threshold is designated regardless of a characteristic (e.g., a frequency, or an intensity) of the audio signal of the audio module. For example, the noise threshold is obtained based on the characteristic (e.g., the frequency, or the intensity) of the audio signal of the audio module.

In the operation 607, the at least one processor 120 may change a switch connection. The ground circuit of the audio module may be changed from an audio module ground circuit to one of at least one antenna ground circuit through a switch (e.g., the switch 280 of FIG. 2). It is because a noise reduction performance of the ground circuit may be improved as a ground area is larger. Due to influence of product miniaturization, a size of the audio module ground circuit may not be sufficient to reduce noise for the audio signal of the audio module. The antenna ground circuit may be sufficiently larger than an audio module ground circuit area to remove the noise. Therefore, a noise reduction performance of the antenna ground circuit may be higher than a noise reduction performance of the audio module ground circuit. A size of a ground circuit area of a plurality of antenna ground circuits may also be different for each antenna ground circuit. Therefore, a noise reduction performance may be different for each antenna ground circuit.

The ground circuit of the audio module may be changed from one of the at least one antenna ground circuit to another one of the at least one antenna ground circuit through the switch 280. It is because a noise reduction performance according to the antenna ground circuit may be different. According to an embodiment, the noise reduction performance may be different according to a characteristic of each antenna ground circuit. For example, the noise reduction performance is different according to an area of each antenna ground circuit. For example, the noise reduction performance is different according to a position of each antenna ground circuit. For example, the noise reduction performance is different according to a configuration of each antenna ground circuit. The at least one processor 120 may identify the noise level of the audio signal after changing the ground circuit of the audio module. The at least one processor 120 may identify whether the noise level of the audio signal exceeds the noise threshold.

The switch 280 may have a plurality of contacts. The switch 280 may be referred to as a ground switch. The switch 280 may be a single pole four throw (SP4T).

The at least one processor 120 may change the ground circuit of the audio module through the switch until the noise level of the audio signal is identified as less than or equal to the noise threshold.

In operation 609, the at least one processor 120 may perform noise reduction processing through a corresponding antenna ground circuit. It is because the noise reduction performance of the ground circuit of the audio module is secured, in case that the noise level of the audio signal is less than or equal to the noise threshold. Therefore, the at least one processor 120 may perform the noise reduction processing through an antenna ground circuit indicating the noise level of the audio signal less than or equal to the noise threshold.

In operation 611, the at least one processor 120 may identify whether the call is terminated. In case that the call is terminated, the at least one processor 120 may terminate an operation of the electronic device 101 for performing the noise reduction processing. In case that the call is not terminated, the at least one processor 120 may perform the operation 605. In the operation 605, the at least one processor 120 may monitor whether the noise level of the audio signal is less than or equal to the noise threshold. According to an embodiment, in case that the call is terminated, the at least one processor 120 may terminate the operation because it is not necessary to perform the noise reduction operation. According to an embodiment, in case that the call is not terminated, since the at least one processor 120 should perform the noise reduction operation, the noise level of the audio signal may be monitored.

In FIG. 6, it is described that in case that the call is terminated after the operation 611, the operation is terminated, but the embodiments of the disclosure are not limited thereto. In case that the electronic device is in the network connection state or the call state after the operation 611, the at least one processor 120 may perform the operation 601 again.

In FIG. 6, it is described that in case that the call is not terminated after the operation 611, the operation 605 is performed, but the embodiments of the disclosure are not limited thereto. According to an embodiment, in case that the call is not terminated after the operation 611, the at least one processor 120 may perform the operation 603 again.

In FIG. 6, it is described that the operation is terminated after the operation 603, but the embodiments of the disclosure are not limited thereto. According to an embodiment, after the operation 603, the at least one processor 120 may perform the operation 601 again. For example, the at least one processor 120 periodically perform the operation 601 for state monitoring of the electronic device. In case that a state change of the electronic device is identified for the state monitoring of the electronic device, the at least one processor 120 may perform the operation 601. For example, the state change means a change in a signal intensity (e.g., a received signal strength indicator (RSSI)). For example, the state change means spatial movement of the electronic device.

Figure 7:
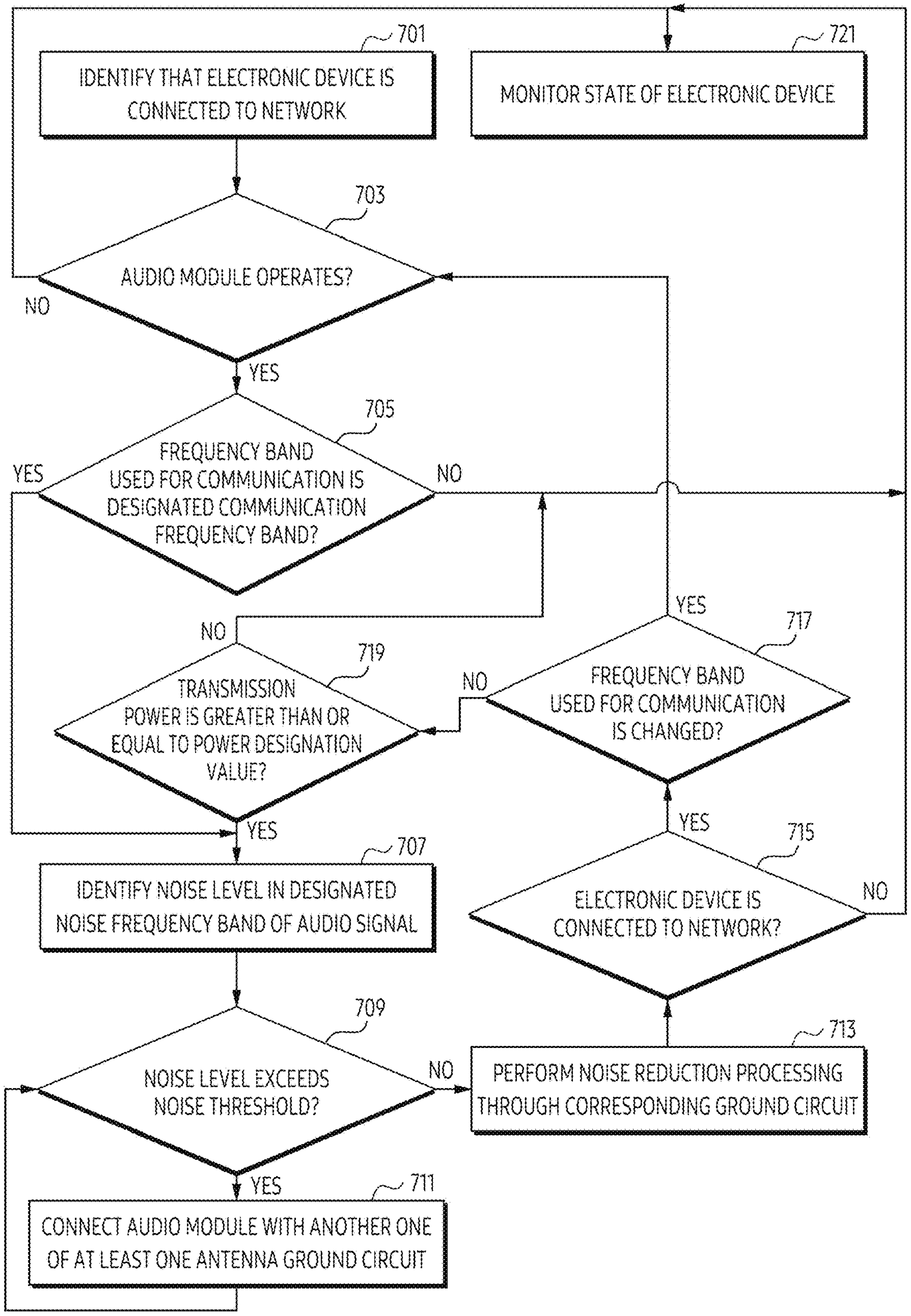
FIG. 7 illustrates a flow of an operation of an electronic device for performing noise reduction processing on an audio signal of an audio module, according to an embodiment of the disclosure.

FIG. 7 illustrates a flow of an operation of an electronic device for performing noise reduction processing on an audio signal of an audio module, according to an embodiment of the disclosure.

Referring to FIG. 7, in operation 701, the at least one processor (e.g., the processor 120 of FIG. 1) may identify that the electronic device (e.g., the electronic device 101 of FIG. 1) is connected to a network. The at least one processor 120 may identify that it is not in an airplane mode. The at least one processor 120 may identify that the electronic device 101 is in wireless communication.

In operation 703, the at least one processor 120 may identify whether an audio module operates. In case that the audio module operates, the at least one processor 120 may perform operation 705. In case that the audio module does not operate, the at least one processor 120 may perform operation 721. The at least one processor 120 may identify whether a service using the audio module is being provided.

In the operation 705, the at least one processor 120 may identify whether a frequency band used for communication is a designated communication frequency band. In case that the frequency band used for the communication is the designated communication frequency band, the at least one processor 120 may perform operation 707. In case that the frequency band used for the communication is not the designated communication frequency band, the at least one processor 120 may perform the operation 721. According to an embodiment, in the designated communication frequency band, wireless communication using a time division multiple access (TDMA) scheme (or a time division duplex (TDD) scheme) may be performed. Alternatively, in the designated communication frequency band, the wireless communication using the time division duplex (TDD) scheme may be performed. For example, the designated communication frequency band is a GSM850. For example, the designated communication frequency band is a GSM900. For example, the designated communication frequency band is a GSM1800. For example, the designated communication frequency band is a GSM1900. For example, the designated communication frequency band is a band 38 (B38) of LTE. For example, the designated communication frequency band is a B40 of the LTE. For example, the designated communication frequency band is a B41 of LTEE. For example, the designated communication frequency band is a N38 of a NR. For example, the designated communication frequency band is a N40 of the NR. For example, the designated communication frequency band is a N41 of the NR. For example, the designated communication frequency band is a N77 of the NR. For example, the designated communication frequency band is a N78 of the NR.

In the operation 707, the at least one processor 120 may identify a noise level in a designated noise frequency band of the audio signal. According to an embodiment, the at least one processor 120 may identify a noise level in a noise frequency band by processing the audio signal. For example, the at least one processor 120 processes the audio signal in a fast Fourier transform, in order to convert a signal with respect to time to a signal with respect to a frequency. According to an embodiment, the designated noise frequency band may be a frequency band in which TDMA noise (or TDD noise) mainly occurs. For example, the noise frequency band is from about 200 Hz to about 300 Hz.

In operation 709, the at least one processor 120 may identify whether the noise level exceeds a noise threshold. Even though the at least one processor 120 changes a ground circuit of the audio module to an antenna ground circuit, the noise level may not be reduced to be less than or equal to the noise threshold. It is because if the noise level is not reduced to be less than or equal to the noise threshold, the at least one processor 120 needs to change the ground circuit of the audio module to another antenna ground circuit. In case that the noise level exceeds the noise threshold, the at least one processor 120 may perform operation 711. In case that the noise level is less than or equal to the noise threshold, the at least one processor 120 may perform noise reduction processing through a corresponding antenna ground circuit. According to an embodiment, if the noise level is not reduced to be less than or equal to the noise threshold even though the ground circuit of the audio module is changed to the antenna ground circuit, the ground circuit of the audio module may be changed to the other antenna ground circuit. The noise threshold may be set to secure a required noise reduction performance. For example, the noise threshold is designated regardless of a characteristic (e.g., a frequency, or an intensity) of the audio signal of the audio module. For example, the noise threshold is obtained based on the characteristic (e.g., the frequency, or the intensity) of the audio signal of the audio module.

In operation the 711, the at least one processor 120 may connect the audio module with another one of the at least one antenna ground circuit. The at least one processor 120 may change the ground circuit of the audio module from an audio module ground circuit to one of the at least one antenna ground circuit based on the noise level of the audio signal exceeding the noise threshold. It is because a noise reduction performance of the audio module ground circuit and a noise reduction performance of the antenna ground circuit may be different. The noise reduction performance of the ground circuit may be improved as a ground area is larger. Due to influence of product miniaturization, a size of the audio module ground circuit may not be sufficient to reduce noise for the audio signal of the audio module. The antenna ground circuit may be sufficiently larger than an audio module ground circuit area to remove the noise. Therefore, the noise reduction performance of the antenna ground circuit may be higher than the noise reduction performance of the audio module ground circuit. It is described that the at least one processor uses a single antenna ground circuit as the ground circuit of the audio module, the embodiments of the disclosure are not limited thereto. According to an embodiment, the at least one processor may use a plurality of antenna ground circuits as the ground circuit of the audio module.

The at least one processor 120 may change the ground circuit of the audio module from one of the at least one antenna ground circuit to the other of the at least one antenna ground circuit. It is because a noise reduction performance according to the antenna ground circuit may be different. According to an embodiment, the noise reduction performance may be different according to a characteristic of each antenna ground circuit. For example, the noise reduction performance is different according to an area of each antenna ground circuit. For example, the noise reduction performance is different according to a position of each antenna ground circuit. For example, the noise reduction performance is different according to a configuration of each antenna ground circuit. The at least one processor 120 may identify the noise level of the audio signal after changing the ground circuit of the audio module. The at least one processor 120 may identify whether the noise level of the audio signal exceeds the noise threshold.

The ground circuit of the audio module may be changed from one of the at least one antenna ground circuit to another one of the at least one antenna ground circuit through a switch (e.g., the switch 280 of FIG. 2). The switch 280 may have a plurality of contacts. The switch 280 may be referred to as a ground switch.

In operation 713, the at least one processor 120 may perform the noise reduction processing through the corresponding ground circuit. It is because the noise reduction performance of the ground circuit of the audio module is secured in case that the noise level of the audio signal is less than or equal to the noise threshold value. Therefore, the at least one processor 120 may perform the noise reduction processing through an antenna ground circuit indicating the noise level of the audio signal less than or equal to the noise threshold.

In operation 715, the at least one processor 120 may identify whether the electronic device is connected to the network. In case that the electronic device is connected to the network, the at least one processor 120 may perform operation 717. In case that the electronic device is not connected to the network, the at least one processor 120 may perform the operation 721. The at least one processor 120 may identify whether network connection is not interrupted.

In the operation 717, the at least one processor 120 may identify whether a communication frequency band used for communication is changed. In case that the communication frequency band used for the communication is changed, the at least one processor 120 may perform the operation 703. In case that the communication frequency band used for the communication is not changed, the at least one processor 120 may perform operation 719. According to an embodiment, in case that the communication frequency band used for the communication frequency is changed, the wireless communication using the time division multiple access (TDMA) scheme (or the time division duplex (TDD)) scheme) may no longer be performed. In case that the communication frequency band used for the communication is changed, the at least one processor 120 may identify whether the audio module operates and/or whether the communication frequency band used for the communication is the designated communication frequency band. In case that the communication frequency band used for the communication is not changed, the at least one processor 120 may monitor whether a transmission power exceeds a power designation value.

In operation 719, the at least one processor 120 may identify whether the transmission power exceeds the power designation value. In case that the transmission power exceeds the power designation value, the at least one processor 120 may perform the operation 707. In case that the transmission power is less than or equal to the power designation value, the at least one processor 120 may perform the operation 721. According to an embodiment, in case that the transmission power exceeds the power designation value, a power drop value may increase, thereby increasing the noise. The transmission power may be greater as a signal intensity (e.g., a received signal strength indicator (RSSI)) is smaller. The RSSI may be a signal reception intensity. As the RSSI becomes smaller, it may be a weak electric field state. As it becomes the weak electric field state, the transmission power may be greater. Accordingly, the at least one processor 120 may identify magnitude of the transmission power by using the RSSI.

In the operation 721, the at least one processor 120 may monitor a state of the electronic device. For example, the at least one processor 120 monitors whether the electronic device is connected to the network. For example, the at least one processor 120 monitors whether the audio module operates. For example, the at least one processor 120 monitors whether the frequency band used for the communication is the designated frequency band. According to an embodiment, the at least one processor 120 may periodically monitor the state of the electronic device. According to a monitoring result, the at least one processor 120 may perform the operation 701 to the operation 719. For example, the at least one processor 120 periodically monitors whether the electronic device is connected to the network. The at least one processor may perform the operation 703 based on the connection between the electronic device and the network. For example, the at least one processor 120 monitors whether the audio module operates. The at least one processor 120 may perform the operation 705 based on the operation of the audio module. For example, the at least one processor 120 monitors whether the frequency band used for the communication is the designated frequency band. The at least one processor 120 may perform the operation 707 based on the designated frequency band being used for the communication.

In FIG. 7, it is described that in case that the frequency band used for the communication is not changed after the operation 717, the operation 719 is performed, but the embodiments of the disclosure are not limited thereto. According to an embodiment, in case that the frequency band used for the communication is not changed after the operation 717, the at least one processor 120 may identify whether an earphone or a universal serial bus (USB) is mounted on the electronic device. The at least one processor 120 may perform the operation 707 based on identifying the mounting of the earphone or the universal serial bus (USB) on the electronic device. The at least one processor 120 may perform the operation 719 based on identifying absence of the earphone or the universal serial bus (USB) on the electronic device.

Figure 8:
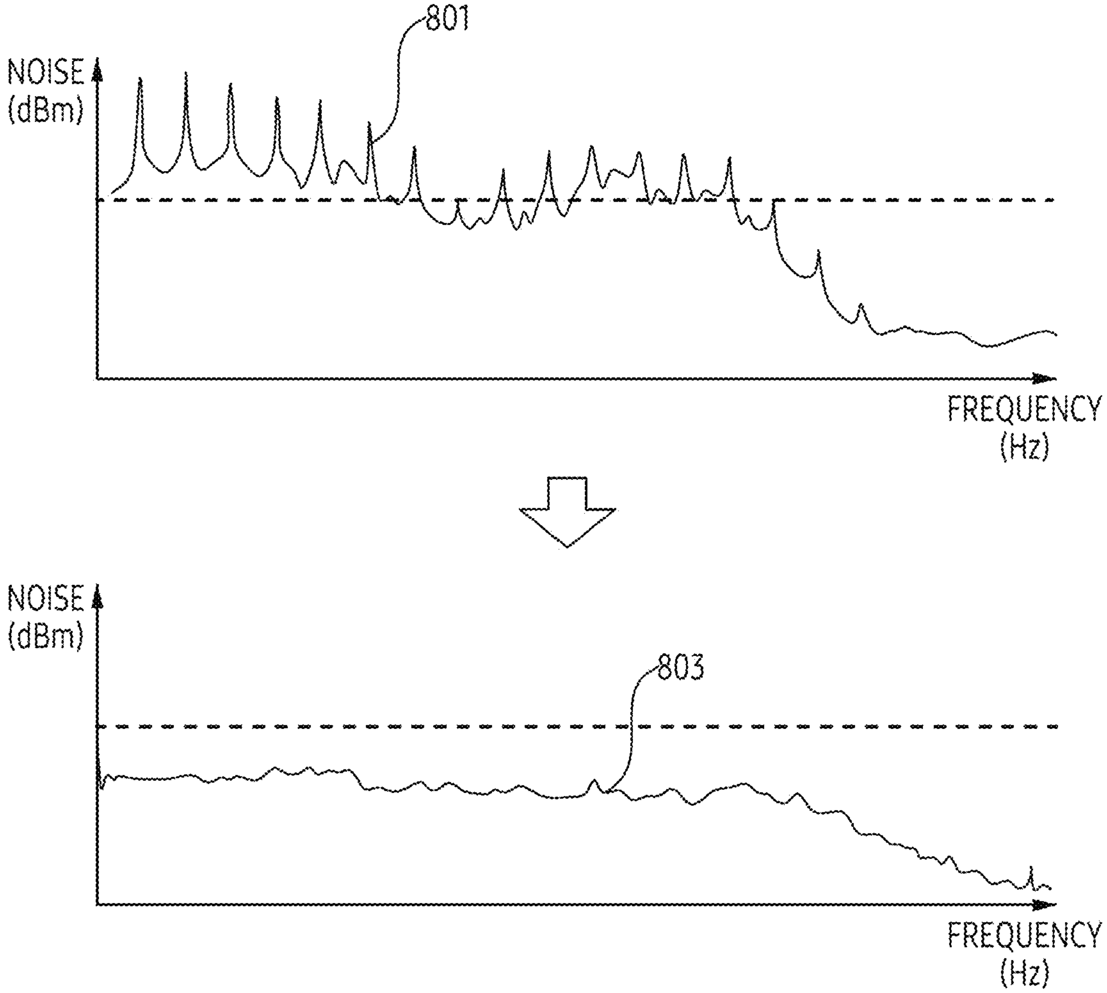
FIG. 8 illustrates an example of a noise level of a ground circuit of an electronic device, according to an embodiment of the disclosure.

FIG. 8 illustrates an example of a noise level of a ground circuit of an electronic device, according to an embodiment of the disclosure.

Referring to FIG. 8, a graph 801 may indicate a noise value of an audio signal of a circuit in which a ground circuit of an audio module is positioned as an audio module ground circuit in a state in which an electronic device 101 is in time division multiple access (TDMA) communication or time division duplex (TDD) communication and using the audio module. A horizontal axis of the graph indicates a frequency (unit: hertz (Hz)), and a vertical axis indicates a noise value (unit: decibel milliwatt (dBm)) of an audio signal.

A graph 803 may indicate a noise value of an audio signal of a circuit in which a ground circuit of the audio module is positioned as an antenna ground circuit in a state in which the electronic device 101 is in the time division multiple access (TDMA) communication or the time division duplex (TDD) communication, and using the audio module. A horizontal axis of the graph indicates a frequency (unit: hertz (Hz)) and a vertical axis indicates a noise value (unit: decibel milliwatt (dBm)) of an audio signal.

The at least one processor 120 may change from the audio module ground circuit to one of at least one antenna ground circuit. The ground circuit of the audio module may be changed from the audio module ground circuit to one of the at least one antenna ground circuit through a switch (e.g., the switch 280 of FIG. 2). A noise reduction performance of the ground circuit may be improved as a ground area is larger. Due to influence of product miniaturization, a size of the audio module ground circuit may not be sufficient to reduce noise for the audio signal of the audio module. The antenna ground circuit may be sufficiently larger than an audio module ground circuit area to remove the noise. Therefore, a noise reduction performance of the antenna ground circuit may be higher than a noise reduction performance of the audio module ground circuit. As in the graph 801 and the graph 803, in case that the ground circuit of the audio module is changed from the audio module ground circuit to the antenna ground circuit, the noise value of the audio signal may be reduced.

Figure 9:
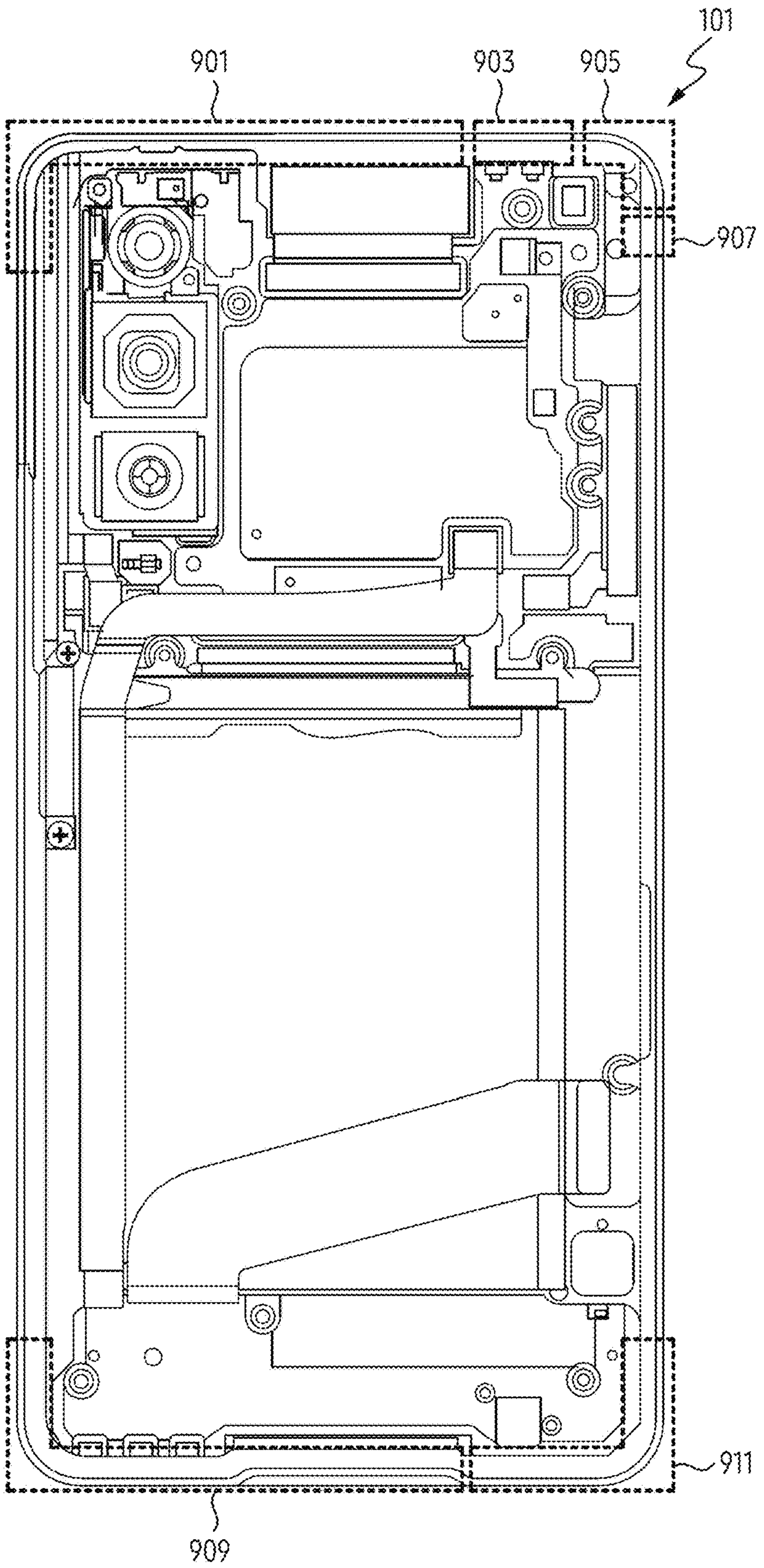
FIG. 9 illustrates an example of an antenna ground circuit according to an embodiment of the disclosure.

FIG. 9 illustrates an example of an antenna ground circuit according to an embodiment of the disclosure.

Referring to FIG. 9, an electronic device (e.g., the electronic device 101 of FIG. 1) may include an upper first antenna 901, an upper second antenna 903, an upper third antenna 905, an upper fourth antenna 907, a lower first antenna 909, and a lower second antenna 911. According to an embodiment, an antenna ground circuit may be positioned for each of the antennas. For example, the electronic device 101 includes an antenna ground circuit corresponding to the upper first antenna 901. For example, the electronic device 101 includes an antenna ground circuit corresponding to the upper second antenna 903. For example, the electronic device 101 includes an antenna ground circuit corresponding to the upper third antenna 905. For example, the electronic device 101 includes an antenna ground circuit corresponding to the upper fourth antenna 907. For example, the electronic device 101 includes an antenna ground circuit corresponding to the lower first antenna 909. For example, the electronic device 101 includes an antenna ground circuit corresponding to the lower second antenna 911. According to an embodiment, a processor (e.g., the at least one processor 120 in FIG. 1) of the electronic device 101 may change a ground circuit of an audio module from an audio module ground circuit to one of at least one antenna ground circuit through a switch (e.g., the switch 280 of FIG. 2).

Figure 10:
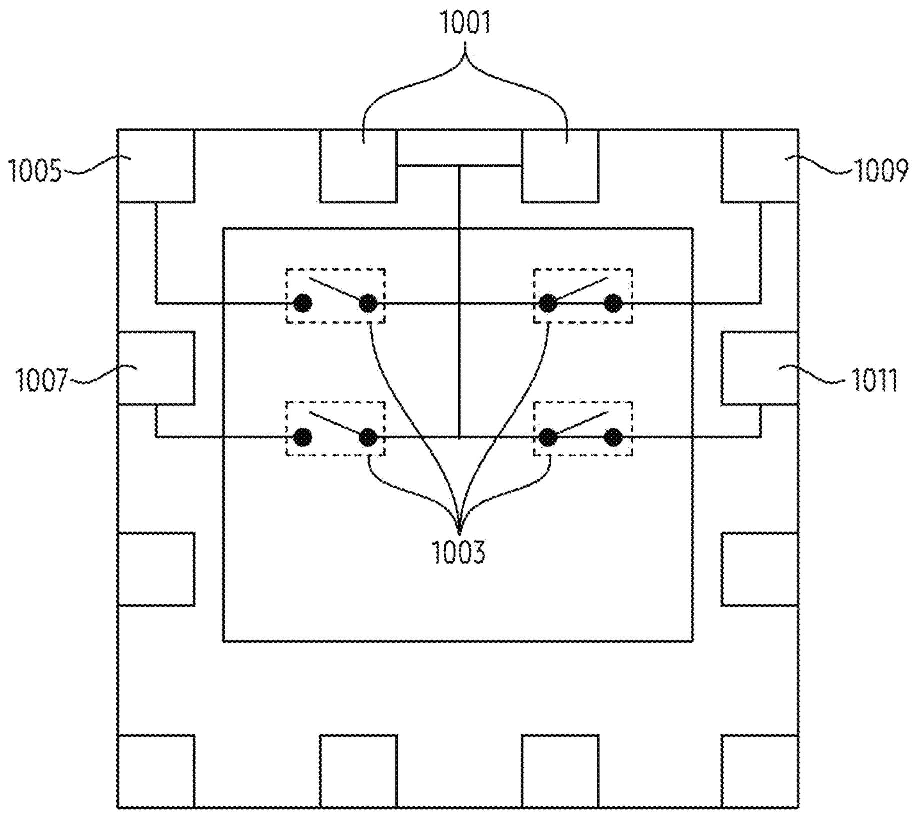
FIG. 10 illustrates an example of a switch of an electronic device according to an embodiment of the disclosure.

FIG. 10 illustrates an example of a switch of an electronic device according to an embodiment of the disclosure. The electronic device (e.g., the electronic device 101) may include a switch 1003 (e.g., the switch 280 of FIG. 2).

Referring to FIG. 10, the switch may be used to change a ground circuit for an audio module. The audio module refers to a component that amplifies a sound wave by changing it into a radio wave, or amplifies a radio wave by changing it into a sound wave. The audio module may include an audio processing unit (e.g., the audio processing unit 250 of FIG. 2) and an audio amplifier (e.g., the audio amplifier 230 of FIG. 2). The ground circuit means a circuit for setting a reference point of a voltage. As the reference point of the voltage is set, noise may be reduced. The switch may have a plurality of switch contacts. The plurality of contacts may be contacts with respect to an audio module ground circuit and/or contacts with respect to an antenna ground circuit.

A first point 1001 may be one point connected to the switch. A first contact 1005 may be another point connected to the switch. The switch 1003 may connect a point and a contact. A second contact 1007 may be another point connected to the switch 1003. A third contact 1009 may be another point connected to the switch 1003. A fourth contact 1011 may be another point connected to the switch 1003. The first point 1001 and another point (e.g., the first contact 1005, the second contact 1007, the third contact 1009, or the fourth contact 1011) may be connected through the switch 1003. For example, the first point 1001 is an audio module (e.g., the audio amplifier 230 of FIG. 2). For example, the first contact 1005 may be a first antenna ground circuit. The second contact 1007 may be a second antenna ground circuit. The third contact 1009 may be a third antenna ground circuit. The fourth contact 1011 may be a fourth antenna ground circuit.

Figure 11:
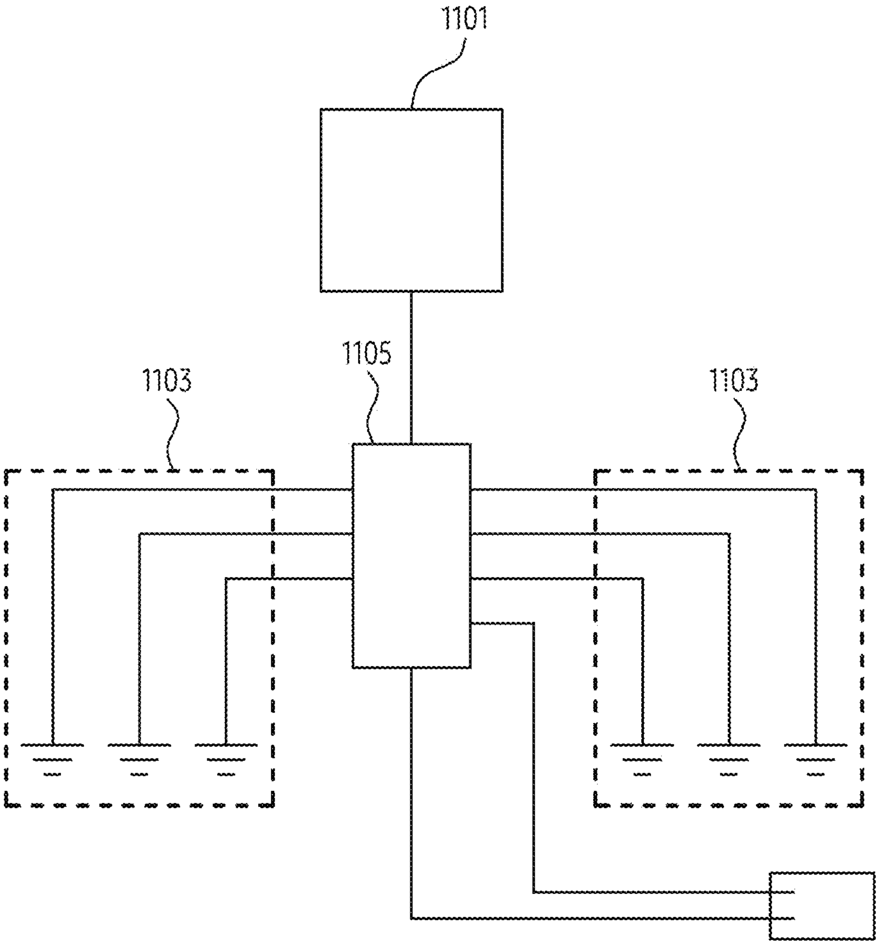
FIG. 11 illustrates a circuit for changing a ground circuit of an audio module through a switch of an audio amplifier of an electronic device, according to an embodiment of the disclosure.

FIG. 11 illustrates a circuit for changing a ground circuit of an audio module through a switch of an audio amplifier of an electronic device, according to an embodiment of the disclosure.

Referring to FIG. 11, an audio amplifier circuit 1101 may configure the audio amplifier. A ground circuit 1103 may be an audio module ground circuit and an antenna ground circuit. A switch 1105 may change the ground circuit of the audio module. According to an embodiment, an operation of changing the ground circuit of the audio module from the audio module ground circuit to one of the at least one antenna ground circuit may be performed through the switch 1105. The operation of changing the ground circuit of the audio module from the antenna ground circuit to another one of the at least one antenna ground circuit may be performed through the switch 1105. The switch 1105 may have a plurality of contacts.

As described above, an electronic device according to an embodiment may comprise at least one processor, an audio module operatively connected to the at least one processor, an audio module ground circuit for the audio module, at least one antenna operatively connected to the at least one processor, and at least one antenna ground circuit for the at least one antenna. The at least one processor may be configured to identify that the electronic device is in time division multiple access (TDMA) communication or time division duplex (TDD) communication while the audio module operates. The at least one processor may be configured to identify a transmission power in the communication based on identifying that the electronic device is in the TDMA communication or the TDD communication while the audio module operates. The at least one processor may be configured to change a ground circuit of the audio module from the audio module ground circuit to one of the at least one antenna ground circuit in a case that the identified transmission power exceeds a threshold, and in a case that a noise level of an audio signal exceeds a noise threshold.

The at least one processor according to an embodiment may be, to change the ground circuit of the audio module from the audio module ground circuit to one of the at least one antenna ground circuit, configured to change the ground circuit of the audio module from the audio module ground circuit to one of the at least one antenna ground circuit. The at least one processor may be configured to identify a noise level of the audio signal. The at least one processor may be configured to change the ground circuit of the audio module from the antenna ground circuit to another one of the at least one antenna ground circuit based on the noise level of the audio signal exceeding the noise threshold. The at least one processor may be configured to perform noise reduction processing through the changed antenna ground circuit based on the noise level of the audio signal less than or equal to the noise threshold.

The at least one processor according to an embodiment may be, to change the ground circuit of the audio module from the audio module ground circuit to one of a plurality of antenna ground circuits, configured to change the ground circuit of the audio module from the audio module ground circuit to one of the plurality of antenna ground circuits. The at least one processor may be configured to identify a noise level of the audio signal. The at least one processor may be configured to connect the audio module to another one of the plurality of antenna ground circuits from the one of the plurality of antenna ground circuits. The at least one processor may be configured to identify a noise level of the audio signal. The at least one processor may be configured to perform noise reduction processing through an antenna ground circuit positioned in a circuit with a lowest noise level of the audio signal, based on identifying all noise levels of each of the plurality of antenna ground circuits.

The at least one processor according to an embodiment may be, to identify the noise level of the audio signal, configured to pass the audio signal to a filter of a designated noise frequency band. The at least one processor may be configured to, in a case that an intensity of the audio signal passing through the filter of the designated noise frequency band is less than a first reference value, identify the noise level of the audio signal as a first level. The at least one processor may be configured to, in a case that an intensity of the audio signal passing through the filter of the designated noise frequency band is greater than or equal to the first reference value, identify the noise level of the audio signal as a second level.

The at least one processor may be configured to change the ground circuit of the audio module to a first antenna ground circuit based on the noise level of the first level. The at least one processor may be configured to change the ground circuit of the audio module to a second antenna ground circuit based on the noise level of the second level.

The electronic device according to an embodiment may further comprise at least one switch. The at least one switch may have a plurality of contacts. The at least one switch may configure to be positioned to connect the audio module to the audio module ground circuit. The at least one switch may configure to be positioned connect the audio module to one of the at least one antenna ground circuit.

The at least one processor according to an embodiment may be, to identify whether communication is performed using a TDMA scheme or a TDD scheme, configured to identify whether the electronic device is connected to a network. The at least one processor may be configured to identify whether a frequency band used in the network is a designated communication frequency band.

The at least one processor according to an embodiment may be further configured to, based on identifying that the electronic device is in the TDMA communication or the TDD communication, identify whether a transmission power exceeds a power designation value. The at least one processor may be further configured to, based on identifying that the transmission power exceeds the power designation value, identify a noise level of the audio signal of the audio module.

The at least one processor according to an embodiment may be, to identify whether the audio module operates, configured to identify whether the electronic device is engaged in a call using a network. The at least one processor may be configured to, based on whether the electronic device is engaged in the call, identify whether audio output is being generated or not.

The at least one processor according to an embodiment may be further configured to, based on identifying that earphones or a USB device is connected to the electronic device, identify a noise level of the audio signal. The at least one processor may be further configured to, based on the noise level of the audio signal exceeding the noise threshold, change the ground circuit of the audio module from one of the at least one antenna ground circuit to another one of the at least one antenna ground circuit.

The at least one processor according to an embodiment may be configured to identify a noise level of the audio signal of the audio module. The at least one processor may be further configured to, based on the noise level of the audio signal exceeding the noise threshold, change the ground circuit of the audio module from the audio module ground circuit to one of the at least one antenna ground circuit.

As described above, a method performed by an electronic device according to an embodiment may comprise identifying that the electronic device is in time division multiple access (TDMA) communication or time division duplex (TDD) communication while an audio module operates. The method may comprise identifying a transmission power in the communication based on identifying that the electronic device is in the TDMA communication or the TDD communication while the audio module operates. The method may comprise, in a case that the identified transmission power exceeds a threshold, changing a ground circuit of the audio module from an audio module ground circuit to one of at least one antenna ground circuit.

According to an embodiment, the changing the ground circuit of the audio module from the audio module ground circuit to one of the at least one antenna ground circuit may comprise changing the ground circuit of the audio module from the audio module ground circuit to one of the at least one antenna ground circuit. The changing the ground circuit of the audio module from the audio module ground circuit to one of the at least one antenna ground circuit may comprise identifying a noise level of the audio signal. The changing the ground circuit of the audio module from the audio module ground circuit to one of the at least one antenna ground circuit may comprise changing the ground circuit of the audio module from the antenna ground circuit to another one of the at least one antenna ground circuits based on the noise level of the audio signal exceeding a noise threshold. The changing the ground circuit of the audio module from the audio module ground circuit to one of the at least one antenna ground circuit may comprise performing noise reduction processing through the changed antenna ground circuit based on the noise level of the audio signal less than or equal to the noise threshold.

According to an embodiment, the changing the ground circuit of the audio module from the audio module ground circuit to one of the at least one antenna ground circuit may comprise changing the ground circuit of the audio module from the audio module ground circuit to one of the at least one antenna ground circuit. The changing the ground circuit of the audio module from the audio module ground circuit to one of the at least one antenna ground circuit may comprise identifying a noise level of the audio signal. The changing the ground circuit of the audio module from the audio module ground circuit to one of the plurality of antenna ground circuits may comprise connecting the audio module to another one of the plurality of antenna ground circuits from the antenna ground circuit. The changing the ground circuit of the audio module from the audio module ground circuit to one of the at least one antenna ground circuit may comprise identifying a noise level of the audio signal. The changing the ground circuit of the audio module from the audio module ground circuit to one of the at least one antenna ground circuit may comprise performing noise reduction processing through an antenna ground circuit positioned in a circuit with a lowest noise level of the audio signal, based on identifying noise levels of each of the plurality of antenna ground circuits.

According to an embodiment, the identifying the noise level of the audio signal may comprise passing the audio signal to a filter of a designated noise frequency band. The identifying the noise level of the audio signal may comprise, in a case that an intensity of the audio signal passing through the filter of the designated noise frequency band is less than a first reference value, identifying the noise level of the audio signal as a first level. The identifying the noise level of the audio signal may comprise, in a case that an intensity of the audio signal passing through the filter of the designated noise frequency band is greater than or equal to the first reference value, identifying the noise level of the audio signal as a second level. The at least one processor may comprise changing the ground circuit of the audio module to a first antenna ground circuit based on the noise level of the first level. The at least one processor may comprise changing the ground circuit of the audio module to a second antenna ground circuit based on the noise level of the second level.

According to an embodiment, the changing the ground circuit of the audio module from the audio module ground circuit to one of the at least one antenna ground circuit may be performed through the at least one switch. The changing the ground circuit of the audio module from the antenna ground circuit to another one of the at least one antenna ground circuit may be performed through the at least one switch. The at least one switch may include a plurality of switch contacts.

According to an embodiment, identifying whether communication is performed using a TDMA scheme or a TDD scheme may comprise identifying whether the electronic device is connected to a network. The identifying whether the communication is performed using the TDMA scheme or the TDD scheme may comprise identifying whether a frequency band used in the network is a designated communication frequency band.

According to an embodiment, the method may further comprise, based on identifying that the electronic device is in the TDMA communication or the TDD communication, identifying whether a transmission power exceeds a power designation value. The method may further comprise, based on identifying that the transmission power exceeds the power designation value, identifying the noise level of the audio signal of the audio module.

According to an embodiment, the identifying whether the audio module operates may comprise identifying whether the electronic device is engaged in a call using a network. The identifying whether the audio module operates may comprise, based on whether the electronic device is engaged in the call, identifying whether audio output is being generated or not.

According to an embodiment, the method may further comprise, based on identifying that earphones or a USB device is connected to the electronic device, identifying the noise level of the audio signal. The method may further comprise, based on the noise level of the audio signal exceeding the noise threshold, changing the ground circuit of the audio module from one of the at least one antenna ground circuit to another one of the at least one antenna ground circuit.

According to an embodiment, the method may further comprise identifying a noise level of the audio signal of the audio module. The method may further comprise, based on the noise level of the audio signal exceeding the noise threshold, changing the ground circuit of the audio module from the audio module ground circuit to one of the at least one antenna ground circuit.

An electronic device according to various embodiments disclosed in the document may be various types of devices. The electronic devices includes, for example, a portable communication device (e.g., a smartphone), a computer device, a portable multimedia device, a portable medical device, a camera, an electronic device, or a home appliance. The electronic device according to an embodiment of the document is not limited to the above-described devices.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module is implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

an audio module;

an audio module ground circuit for the audio module;

at least one antenna;

at least one antenna ground circuit for the at least one antenna;

memory storing one or more computer programs; and one or more processors communicatively coupled to the audio module, the audio module ground circuit, the at least one antenna, the at least one antenna ground circuit and the memory, and wherein the one or more computer programs include computer-executable instructions that, when executed by the one or more processors individually or collectively, cause the electronic device to:

identify that the electronic device is in time division multiple access (TDMA) communication or time division duplex (TDD) communication while the audio module operates, identify a transmission power in the communication based on identifying that the electronic device is in the TDMA communication or the TDD communication while the audio module operates, and change a ground circuit of the audio module from the audio module ground circuit to one of the at least one antenna ground circuit in a case that the identified transmission power exceeds a threshold.

2. The electronic device of claim 1, wherein, to change the ground circuit of the audio module from the audio module ground circuit to one of the at least one antenna ground circuit, the one or more computer programs further include computer-executable instructions that, when executed by the one or more processors individually or collectively, cause the electronic device to:

change the ground circuit of the audio module from the audio module ground circuit to one of the at least one antenna ground circuit, identify a noise level of an audio signal, change the ground circuit of the audio module from the antenna ground circuit to another one of the at least one antenna ground circuit based on the noise level of the audio signal exceeding a noise threshold, and perform noise reduction processing through the changed antenna ground circuit based on the noise level of the audio signal being less than or equal to the noise threshold.

3. The electronic device of claim 1, wherein, to change the ground circuit of the audio module from the audio module ground circuit to one of a plurality of antenna ground circuits, the one or more computer programs further include computer-executable instructions that, when executed by the one or more processors individually or collectively, cause the electronic device to:

change the ground circuit of the audio module from the audio module ground circuit to one of the plurality of antenna ground circuits, identify a noise level of an audio signal, connect the audio module to another one of the plurality of antenna ground circuits from the one of the plurality of antenna ground circuits, identify a noise level of the audio signal, and perform noise reduction processing through an antenna ground circuit positioned in a circuit with a lowest noise level of the audio signal, based on identifying all noise levels of each of the plurality of antenna ground circuits.

4. The electronic device of claim 3, wherein, to identify the noise level of the audio signal, the one or more computer programs further include computer-executable instructions that, when executed by the one or more processors individually or collectively, cause the electronic device to:

pass the audio signal to a filter of a designated noise frequency band, in a case that an intensity of the audio signal passing through the filter of the designated noise frequency band is less than a first reference value, identify the noise level of the audio signal as a first level, in a case that an intensity of the audio signal passing through the filter of the designated noise frequency band is greater than or equal to the first reference value, identify the noise level of the audio signal as a second level, change the ground circuit of the audio module to a first antenna ground circuit based on the noise level of the first level, and change the ground circuit of the audio module to a second antenna ground circuit based on the noise level of the second level.

5. The electronic device of claim 1, further comprising:

at least one switch, wherein the at least one switch has a plurality of contacts, and is disposed to:

connect the audio module to the audio module ground circuit, or connect the audio module to one of the at least one antenna ground circuit.

6. The electronic device of claim 1, wherein, to identify whether communication is performed using a TDMA scheme or a TDD scheme, the one or more computer programs further include computer-executable instructions that, when executed by the one or more processors individually or collectively, cause the electronic device to:

identify whether the electronic device is connected to a network, and identify whether a frequency band used in the network is a designated communication frequency band.

7. The electronic device of claim 1, wherein the one or more computer programs further include computer-executable instructions that, when executed by the one or more processors individually or collectively, cause the electronic device to:

based on identifying that the electronic device is in the TDMA communication or the TDD communication, identify whether a transmission power exceeds a power designation value, and based on identifying that the transmission power exceeds the power designation value, identify a noise level of an audio signal of the audio module.

8. The electronic device of claim 1, wherein, to identify whether the audio module operates, the one or more computer programs further include computer-executable instructions that, when executed by the one or more processors individually or collectively, cause the electronic device to:

identify whether the electronic device is engaged in a call using a network; and based on the identified of whether the electronic device is engaged in the call, identify whether audio output is being generated or not.

9. The electronic device of claim 2, wherein the one or more computer programs further include computer-executable instructions that, when executed by the one or more processors individually or collectively, cause the electronic device to:

based on identifying that earphones or a universal serial bus (USB) device is connected to the electronic device, identify a noise level of the audio signal; and based on the noise level of the audio signal exceeding the noise threshold, change the ground circuit of the audio module from one of the at least one antenna ground circuit to another one of the at least one antenna ground circuit.

10. The electronic device of claim 9, wherein the one or more computer programs further include computer-executable instructions that, when executed by the one or more processors individually or collectively, cause the electronic device to:

identify a noise level of the audio signal of the audio module; and based on the noise level of the audio signal exceeding the noise threshold, change the ground circuit of the audio module from the audio module ground circuit to one of the at least one antenna ground circuit.

11. A method performed by an electronic device, the method comprising:

identifying, by the electronic device, that the electronic device is in time division multiple access (TDMA) communication or time division duplex (TDD) communication while an audio module operates;

identifying, by the electronic device, a transmission power in the communication based on identifying that the electronic device is in the TDMA communication or the TDD communication while the audio module operates; and in a case that the identified transmission power exceeds a threshold, changing, by the electronic device, a ground circuit of the audio module from an audio module ground circuit to one of at least one antenna ground circuit.

12. The method of claim 11, wherein the changing of the ground circuit of the audio module from the audio module ground circuit to one of the at least one antenna ground circuit comprises:

changing the ground circuit of the audio module from the audio module ground circuit to one of the at least one antenna ground circuit;

identifying a noise level of an audio signal;

changing the ground circuit of the audio module from the antenna ground circuit to another one of the at least one antenna ground circuit based on the noise level of the audio signal exceeding a noise threshold; and performing noise reduction processing through the changed antenna ground circuit based on the noise level of the audio signal being less than or equal to the noise threshold.

13. The method of claim 11, wherein the changing of the ground circuit of the audio module from the audio module ground circuit to one of a plurality of antenna ground circuits, comprises:

changing the ground circuit of the audio module from the audio module ground circuit to one of the plurality of antenna ground circuits;

identifying a noise level of an audio signal;

connecting the audio module to another one of the plurality of antenna ground circuits from the one of the plurality of antenna ground circuits;

identifying a noise level of the audio signal; and performing noise reduction processing through an antenna ground circuit positioned in a circuit with a lowest noise level of the audio signal, based on identifying noise levels of each of the plurality of antenna ground circuits.

14. The method of claim 13, wherein the identifying the noise level of the audio signal comprises:

passing the audio signal to a filter of a designated noise frequency band;

in a case that an intensity of the audio signal passing through the filter of the designated noise frequency band is less than a first reference value, identifying the noise level of the audio signal as a first level;

in a case that an intensity of the audio signal passing through the filter of the designated noise frequency band is greater than or equal to the first reference value, identifying the noise level of the audio signal as a second level;

changing the ground circuit of the audio module to a first antenna ground circuit based on the noise level of the first level; and changing the ground circuit of the audio module to a second antenna ground circuit based on the noise level of the second level.

15. The method of claim 11, wherein the changing the ground circuit of the audio module from the audio module ground circuit to one of the at least one antenna ground circuit is performed through at least one switch, wherein the changing the ground circuit of the audio module from the antenna ground circuit to another one of the at least one antenna ground circuit is performed through the at least one switch, and wherein the at least one switch includes a plurality of switch contacts.

16. The method of claim 11, wherein, when the identifying of whether communication is performed using a TDMA scheme or a TDD scheme, the method further comprises:

identify whether the electronic device is connected to a network, and identify whether a frequency band used in the network is a designated communication frequency band.

17. The method of claim 11, further comprising:

based on identifying that the electronic device is in the TDMA communication or the TDD communication, identify whether a transmission power exceeds a power designation value, and based on identifying that the transmission power exceeds the power designation value, identify a noise level of an audio signal of the audio module.

18. The method of claim 11, wherein, when the identifying of whether the audio module operates, the method further comprises:

identify whether the electronic device is engaged in a call using a network; and based on the identified of whether the electronic device is engaged in the call, identify whether audio output is being generated or not.

19. One or more non-transitory computer-readable storage media storing one or more computer programs including computer-executable instructions that, when executed by one or more processors of an electronic device individually or collectively, cause the electronic device to perform operations, the operations comprising:

identifying that the electronic device is in time division multiple access (TDMA) communication or time division duplex (TDD) communication while an audio module operates;

identifying, by the electronic device, a transmission power in the communication based on identifying that the electronic device is in the TDMA communication or the TDD communication while the audio module operates; and in a case that the identified transmission power exceeds a threshold, changing, by the electronic device, a ground circuit of the audio module from an audio module ground circuit to one of at least one antenna ground circuit.

20. The one or more non-transitory computer-readable storage media of claim 19, wherein the changing of the ground circuit of the audio module from the audio module ground circuit to one of the at least one antenna ground circuit comprises:

changing the ground circuit of the audio module from the audio module ground circuit to one of the at least one antenna ground circuit;

identifying a noise level of an audio signal;

changing the ground circuit of the audio module from the antenna ground circuit to another one of the at least one antenna ground circuit based on the noise level of the audio signal exceeding a noise threshold; and performing noise reduction processing through the changed antenna ground circuit based on the noise level of the audio signal being less than or equal to the noise threshold.

* * * * *